United States Patent
Shuto et al.

(10) Patent No.: US 12,359,726 B2
(45) Date of Patent: Jul. 15, 2025

(54) METHOD OF MANUFACTURING HUB SEAL

(71) Applicant: NOK CORPORATION, Tokyo (JP)

(72) Inventors: Yuichi Shuto, Fukushima (JP); Yuichi Tarukawa, Fukushima (JP); Kazuki Hirota, Fukushima (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/727,253

(22) PCT Filed: Dec. 28, 2022

(86) PCT No.: PCT/JP2022/048497
§ 371 (c)(1),
(2) Date: Jul. 8, 2024

(87) PCT Pub. No.: WO2023/136160
PCT Pub. Date: Jul. 20, 2023

(65) Prior Publication Data
US 2025/0084923 A1   Mar. 13, 2025

(30) Foreign Application Priority Data
Jan. 12, 2022  (JP) .................... 2022-003360

(51) Int. Cl.
*F16J 15/328* (2016.01)
*F16C 33/78* (2006.01)
*F16J 15/3232* (2016.01)

(52) U.S. Cl.
CPC ....... *F16J 15/3232* (2013.01); *F16C 33/7823* (2013.01); *F16J 15/328* (2013.01); *F16C 2326/02* (2013.01)

(58) Field of Classification Search
CPC . F16C 2326/02; F16C 33/7823; F16J 15/328; F16J 15/3232
See application file for complete search history.

(56) References Cited

U.S. PATENT DOCUMENTS 11,421,741 B2 *  8/2022  Shimada ............. B21D 19/088
2002/0047242 A1 *  4/2002  Watanabe ........... F16J 15/3232
                                                       277/553
(Continued)

FOREIGN PATENT DOCUMENTS

| JP | 3201207 U | 11/2015 |
| JP | 2018-084318 A | 5/2018 |
| JP | 2019-113118 A | 7/2019 |

OTHER PUBLICATIONS

International Search Report of the International Searching Authority, issued in PCT/JP2022/048497, mailed Feb. 28, 2023; ISA/JP (5 pages).

*Primary Examiner* — Eugene G Byrd
(74) *Attorney, Agent, or Firm* — Harness, Dickey & Pierce, P.L.C.

(57) ABSTRACT

A method of manufacturing a hub seal is provided. In the method, a lip reaction force F/hub diameter D and a lip surface roughness R are selected from within a designed region, which is a region of the lip reaction force F/hub diameter D and the lip surface roughness R, set in advance on the basis of a value (lip reaction force F/hub diameter D) given by dividing a reaction force F, which is a value of a reaction force of the side lip in an in-use state, by a hub diameter D, which is a value of a diameter of a hub, and the lip surface roughness R, which is a value of a surface roughness of a seal surface of the side lip. The hub seal is designed such that the lip reaction force F/hub diameter D and the lip surface roughness R become the selected lip reaction force F/hub diameter D and lip surface roughness R. The hub seal is manufactured based on the designed hub seal.

5 Claims, 13 Drawing Sheets

(56) References Cited

U.S. PATENT DOCUMENTS

| | | | |
|---|---|---|---|
| 2003/0044269 A1* | 3/2003 | Iketani | F16C 33/7859 |
| | | | 415/111 |
| 2012/0223266 A1* | 9/2012 | Furukoshi | F02D 9/106 |
| | | | 251/305 |
| 2016/0178010 A1* | 6/2016 | Kaiser | F16C 33/7896 |
| | | | 277/351 |
| 2018/0258996 A1* | 9/2018 | Sato | F16C 33/7823 |
| 2018/0274587 A1* | 9/2018 | Yano | F16C 33/7823 |
| 2018/0283455 A1* | 10/2018 | Iizuka | F16C 33/7846 |
| 2019/0257427 A1* | 8/2019 | Lor | F16J 15/3264 |
| 2021/0010532 A1 | 1/2021 | Shiramizu et al. | |
| 2022/0034365 A1* | 2/2022 | Dahinten | F16C 33/7826 |
| 2024/0068519 A1* | 2/2024 | Tamura | F16C 33/7823 |
| 2024/0140191 A1* | 5/2024 | Lim | F16J 15/3456 |
| 2025/0084923 A1* | 3/2025 | Shuto | F16C 33/7823 |

\* cited by examiner

METHOD OF MANUFACTURING HUB SEAL

CROSS REFERENCE TO RELATED APPLICATIONS

The present application is a national phase application of International Patent Application No. PCT/JP2022/048497 filed on Dec. 28, 2022, which claims the benefit of Japanese Patent Application No. 2022-003360, filed on Jan. 12, 2022. The contents of these applications are incorporated herein by reference in their entirety.

BACKGROUND

Technical Field

The present disclosure relates to a method of manufacturing a hub seal.

Related Art

In a vehicle, for example, an automobile, a hub bearing by which a wheel is rotatably supported is under an environment where the hub bearing will be directly exposed to foreign substances such as rainwater, muddy water, and dust. Accordingly, the hub bearing has been attached with a hub seal, which is a sealing device, in order to seal a space made between an outer ring, which is relatively rotatable around an axis, and a hub. The hub seal is designed to seal a lubricant inside the hub bearing and prevent the entry of a foreign substance into the inside. Moreover, as for such a hub seal, reduction and stabilization of a sliding resistance (a torque resistance) applied to the hub bearing by a seal lip of the hub seal have been demanded in response to demands for a reduction in fuel consumption and the like. Accordingly, some conventional hub seals are designed so as to reduce and stabilize the torque resistance (see, for example, Registered Utility Model No. 3201207).

In the meanwhile, an outer peripheral surface of a hub of a hub bearing is formed by machining, so that there are finishing scars (machining scratches) attributed to machining left on the outer peripheral surface of the hub in some cases. There are hub bearings in which the machining scratches have a certain directionality. That is to say, there are cases where machining scratches in a form of a plurality of spiral or linear groove-shaped scars extending around or along a rotary axis are formed on the outer peripheral surface of the hub bearing. In a case where such machining scratches are formed on the outer peripheral surface of the hub, there is a possibility that a pumping action based on the machining scratches occurs during the rotation of the hub bearing depending on the directionality of the machining scratches, causing air, grease, and the like in a sealed space, which is made by seal lips adjacent to each other, to be discharged out of the sealed space. As a result, there is a possibility that a pressure in the sealed space falls below a pressure of atmosphere to become negative, causing the seal lip to be pressed against the outer peripheral surface of the hub. The negative pressure then causes a disturbance in the rotation torque of the hub bearing or produces an abnormal noise in some cases.

In order to prevent such a disturbance in the rotation torque of the hub bearing and production of an abnormal noise, there are possible measures to decrease a force of the seal lip to tighten the outer peripheral surface of the hub (a tightening force of the seal lip). However, a decrease in the tightening force of the seal lip leads to a decrease in sealing performance. Accordingly, a conventional hub seal for a hub bearing has been demanded to have a configuration that enables preventing a decrease in sealing performance and preventing a disturbance in the rotation torque of the hub bearing and the production of an abnormal noise.

An object of the present disclosure is to provide a method of manufacturing a hub seal that makes it possible to reduce a decrease in sealing performance and reduce a disturbance in the rotation torque of an inner peripheral member and the production of an abnormal noise even though there are machining scratches left on a surface where a seal lip is to be in contact.

SUMMARY

To solve the above-described problem, a method of manufacturing a hub seal according to the disclosure, the hub seal including a side lip and being designed to seal a space between an outer ring and a hub of a hub bearing, includes: selecting, from within a designed region set in advance on the basis of a value (lip reaction force F/hub diameter D) given by dividing a reaction force F, which is a value of a reaction force of the side lip in the in-use state, by a hub diameter D, which is a value of a diameter of the hub, and a lip surface roughness R, which is a value of a surface roughness of a seal surface that is a surface of the side lip to be in contact with the hub, the lip reaction force F/hub diameter D and the lip surface roughness R, the designed region being a region of the lip reaction force F/hub diameter D and the lip surface roughness R; designing the hub seal such that the lip reaction force F/hub diameter D and the lip surface roughness R become the selected lip reaction force F/hub diameter D and lip surface roughness R; and manufacturing the hub seal such that the hub seal becomes the designed hub seal, in which the designed region is a region included in neither torque disturbance region nor a sealing performance decrease region, the torque disturbance region being a region of the lip reaction force F/hub diameter D and the lip surface roughness R and that is set in advance on the basis of the lip reaction force F/hub diameter D and the lip surface roughness R, the sealing performance decrease region being a region of the lip reaction force F/hub diameter D and the lip surface roughness R and that is set in advance on the basis of the lip reaction force F/hub diameter D and the lip surface roughness R, the torque disturbance region is a region where torque disturbance is supposed to occur, and the sealing performance decrease region is a region where a sealing performance is supposed to decrease.

In the method of manufacturing a hub seal according to an aspect of the present disclosure, the lip reaction force F is determined on the basis of at least one of an angle of an extending direction of the side lip relative to a direction orthogonal to an axis of the hub seal, a length of the side lip in the extending direction, a thickness of the side lip in a direction orthogonal to the extending direction, and a shape of a root of the side lip.

In the method of manufacturing a hub seal according to an aspect of the present disclosure, the lip reaction force F/hub diameter D and the lip surface roughness R are selected from within a target region, the target region being a region set in advance in the designed region.

In the method of manufacturing a hub seal according to an aspect of the present disclosure, a range of the lip reaction force F/hub diameter D in the target region is in a range from 0.05 N/mm to 0.09 N/mm, a range of the lip surface roughness R in the target region is in a range from RzJIS 10 μm−α to RzJIS 10 μm+α, and the α is a tolerance during forming of the side lip.

In the method of manufacturing a hub seal according to an aspect of the present disclosure, whether or not the side lip having the selected lip reaction force F/hub diameter D and lip surface roughness R comes into existence in the hub bearing is determined to select the lip reaction force F/hub diameter D and the lip surface roughness R.

Effect(s) of Disclosure

The method of manufacturing a hub seal according to the present disclosure makes it possible to reduce a decrease in sealing performance and reduce a disturbance in the rotation torque of an inner peripheral member and the production of an abnormal noise even though there are machining scratches left on a surface where a seal lip is to be in contact.

DETAILED DESCRIPTION

Description will be made below on an embodiment of the present disclosure with reference to the drawings.

Figure 1:
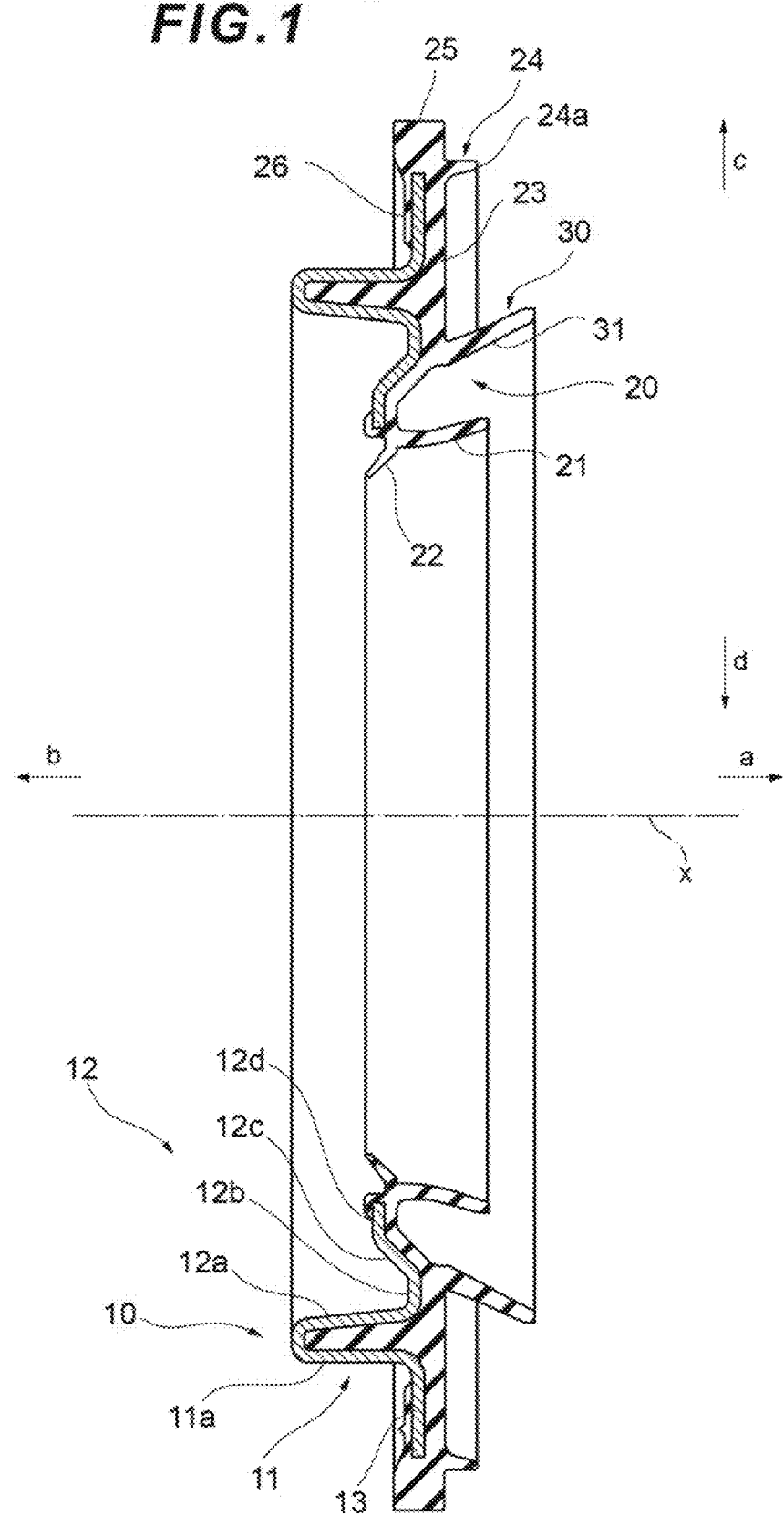
FIG. 1 is a cross-sectional view of a cross section along an axis for illustrating a schematic configuration of a hub seal according to an embodiment of the present disclosure.

FIG. 1 is a cross-sectional view of a cross section along an axis x of a hub seal 1 according to an embodiment of the present disclosure, which is manufactured by a method of manufacturing a hub seal according to the present disclosure. The hub seal manufactured by the method of manufacturing a hub seal according to the present disclosure is a hub seal including a side lip and is designed to seal a space between an outer peripheral member and an inner peripheral member. The inner peripheral member is at least partially surrounded by the outer peripheral member and relatively rotatable with respect to the outer peripheral member. Specifically, the hub seal 1 according to the embodiment of the present disclosure is to be used in a hub bearing 50 in order to seal a space between an outer ring 51, which is the outer peripheral member, relatively rotatable around an axis and a hub 52, which is the inner peripheral member as described later (see FIG. 3).

Hereinbelow, for the convenience of explanation, a side of a direction of an arrow a (see FIG. 1) along an axis-x direction (one side along the axis direction) is defined as an outer side and a side of a direction of an arrow b (see FIG. 1) along the axis-x direction (the opposite side along the axis direction) is defined as an inner side. More specifically, the outer side is a side of a direction, along the axis-x direction, to become distant from the space between the outer ring 51 and the hub 52, which is a space to seal, and the inner side is a side of a direction, along the axis-x direction, to approach the space to seal. Moreover, along a direction (hereinafter, also referred to as "radial direction") perpendicular to the axis x, a side of a direction to become distant from the axis x (an arrow-c direction in FIG. 1) is defined as an outer peripheral side and a side of a direction to approach the axis x (an arrow-d direction in FIG. 1) is defined as an inner peripheral side. It should be noted that the axis x is an imaginary line.

As illustrated in FIG. 1, the hub seal 1 includes an annular reinforcing ring 10 around the axis x and an elastic body piece 20 attached to the reinforcing ring 10 and made of an annular elastic body around the axis x. The elastic body piece 20 includes a side lip 30, a middle lip 21, and a main lip 22. The side lip 30 is a seal lip formed such that the side lip 30 is in contact with the hub 52 from the inner side (the arrow-b direction side) in a later-described in-use state in which the hub seal 1 is attached to the hub bearing 50 and that extends toward the outer side (the arrow-a direction side). The middle lip 21 is a seal lip formed such that the middle lip 21 is in contact with the hub 52 from the inner side in the in-use state and that extends toward the outer side on an inner peripheral side relative to the side lip 30. The main lip 22 is a seal lip formed such that the main lip 22 is in contact with the hub 52 from the outer peripheral side in the in-use state. The side lip 30 is in such a shape as to reduce the torque disturbance of the hub 52 and a decrease in the sealing performance of the side lip 30 and the shape of the side lip 30 is based on: a value (lip reaction force F/hub diameter D) given by dividing a value of a reaction force (a lip reaction force F) of the side lip 30 in the in-use state by a value of a diameter (a hub diameter D) of the hub 52; and a value of a surface roughness (a lip surface roughness R) of a seal surface 31, which is a surface of the side lip 30 to be in contact with the hub 52. The hub seal 1 will be specifically described below.

As illustrated in, for example, FIG. 1, the reinforcing ring 10 is an annular metal member around or substantially around the axis x and is formed such that the reinforcing ring 10 is to be pressed and fitted in a later-described through hole of the outer ring 51 of the hub bearing 50. With the reinforcing ring 10 press-fitted in the outer ring 51, the hub seal 1 is fixed to the outer ring 51. As illustrated in, for example, FIG. 1, the reinforcing ring 10 includes a cylindrical fitting portion 11, a position adjusting portion 12 bent from an inner end portion of the fitting portion 11 toward the inner peripheral side and extending toward the outer side, and a flange portion 13 in or substantially in a circular shape extending from an outer end portion of the fitting portion toward the outer peripheral side.

The fitting portion 11 is, for example, a portion in or substantially in a shape of a cylindrical column around or substantially around the axis x and is formed such that the fitting portion 11 is press-fitted, at an outer peripheral surface 11a, which is a peripheral surface on the outer peripheral side, into an outer opening portion 51a of the outer ring 51 to be fitted on an inner peripheral surface thereof as described later. The position adjusting portion 12 is in such a shape as to place the side lip 30, the middle lip 21, and the main lip 22 at respective desired positions in the hub seal 1. The position adjusting portion 12 includes a turn-back portion 12a, a connection flange portion 12b, a turn-back portion 12c, and a lip flange portion 12d as illustrated in, for example, FIG. 1. The turn-back portion 12a is, for example, a portion substantially in a shape of a blunted cone or substantially in a shape of a cylindrical column and that is bent from an inner end of the fitting portion 11 and turned back toward the outer side. The connection flange portion 12b is, for example, a portion in or substantially in a circular shape and that extends from an outer end of the turn-back portion 12a toward the inner peripheral side. The turn-back portion 12c is, for example, a portion in or substantially in a shape of a blunted cone obliquely extending from an inner peripheral end of the connection flange portion 12b toward the inner side and the inner peripheral side. The lip flange portion 12d is, for example, a portion in or substantially in a circular shape and that extends from an inner peripheral end of the turn-back portion 12c toward the inner peripheral side. The flange portion 13 is a portion in or substantially in a circular shape and that stretches in the radial direction around or substantially around the axis x as illustrated in, for example, FIG. 1. The reinforcing ring 10 is formed as a one-piece member from a metal plate by presswork or hammering and the fitting portion 11, the position adjusting portion 12, and the flange portion 13 are the portions of the reinforcing ring 10 that are formed as one piece from the same material and integrally continuous. A metal material of the reinforcing ring 10 is, for example, stainless steel or SPCC (steel plate cold commercial).

The elastic body piece 20 is attached to the reinforcing ring 10 as described above and is integrally formed with the reinforcing ring 10 such that the elastic body piece 20 covers the reinforcing ring 10 from outside as illustrated in, for example, FIG. 1. The elastic body piece 20 includes, for example, a base portion 23. The base portion 23 is a portion supporting the side lip 30, the middle lip 21, and the main lip 22 and the side lip 30, the middle lip 21, and the main lip 22 each extend from the base portion 23. The middle lip 21 and the main lip 22 each extend, for example, from an inner peripheral end portion of the base portion 23 and the side lip 30 extends, for example, from the base portion 23 on an outer peripheral side relative to the middle lip 21 at a distance in the radial direction from the middle lip 21. The base portion 23 stretches, for example, on an outer surface of the reinforcing ring 10 across the flange portion 13, the fitting portion 11, and the position adjusting portion 12 of the reinforcing ring 10.

Figure 2:
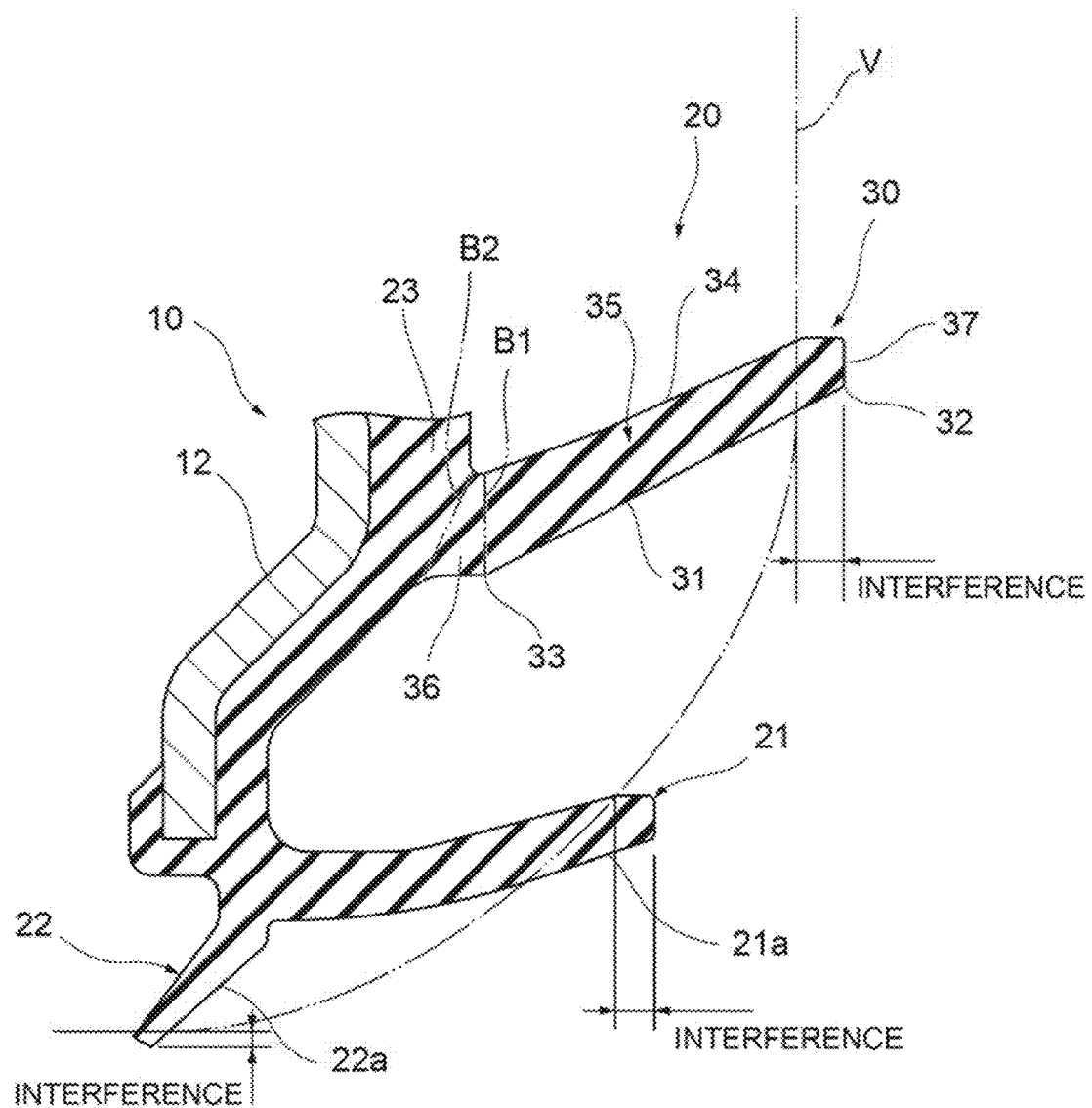
FIG. 2 is a partial enlarged cross-sectional view illustrating, in close-up, a neighborhood of a side lip, a middle lip, and a main lip of the hub seal illustrated in FIG. 1.

FIG. 2 is a partial enlarged cross-sectional view illustrating, in close-up, a neighborhood of the side lip 30, the middle lip 21, and the main lip 22 of the hub seal 1. As illustrated in FIGS. 1 and 2, the side lip 30 annularly extends around or substantially around the axis x toward the outer side from the base portion 23 and is formed such that, in the later-described in-use state of the hub seal 1, a distal end portion of the seal surface 31 is in contact with the hub 52 with a predetermined interference. For example, the side lip 30 is in or substantially in a shape of a blunted cone flared toward the outer side in the axis-x direction.

As illustrated in FIGS. 1 and 2, the middle lip 21 annularly extends around or substantially around the axis x toward the outer side from the base portion 23 and is formed such that, in the later-described in-use state of the hub seal 1, a distal end portion of a seal surface 21a is in contact with the hub 52 with a predetermined interference. For example, the middle lip 21 is in or substantially in a shape of a blunted cone flared toward the outer side in the axis-x direction. The middle lip 21 may extend toward the outer side in parallel with the side lip 30 or may be less inclined with respect to the axis x than the side lip 30 as illustrated in FIGS. 1 and 2, and vice-versa. For example, as illustrated in FIGS. 1 and 2, the main lip 22 annularly extends around or substantially around the axis x from the base portion 23 toward the inner side and the inner peripheral side. The main lip 22 is formed such that, in the later-described in-use state of the hub seal 1, a distal end portion of a seal surface 22a is in contact with the hub 52 from the outer peripheral side with a predetermined interference. The seal surface 31 of the side lip 30, the seal surface 21a of the middle lip 21, and the seal surface 22a of the main lip 22 are each coated with grease (not illustrated), which is a lubricant. It should be noted that the seal surface 31 of the side lip 30, the seal surface 21a of the middle lip 21, and the seal surface 22a of the main lip 22 are surfaces facing the inner peripheral sides of the side lip 30, the middle lip 21, and the main lip 22, respectively.

The interference of the seal lip is a length for the seal lip in a free state of being not deformed by external force to project over a contact surface with which the seal lip is in contact in the in-use state. Specifically, the interference of the side lip 30 is a length of a portion of the seal surface 31 in the axis-x direction and the portion projects over a surface of the hub 52 (an inner peripheral surface 55d of a wheel mounting flange 55b), which is a contact surface depicted as an imaginary line V in FIG. 2. Moreover, the interference of the middle lip 21 is a length of a portion of the seal surface 21a in the axis-x direction and the portion projects over a contact surface of the hub 52 depicted as the imaginary line V (a transition portion 55c of the wheel mounting flange 55b). Moreover, the interference of the main lip 22 is a length of a portion of the seal surface 22a in the radial direction and the portion projects over a contact surface of the hub 52 depicted as the imaginary line V (an outer peripheral surface 55e of a shaft portion 55a).

The elastic body piece 20 is also formed with an outer peripheral annular projection 24 as illustrated in, for example, FIG. 1. The outer peripheral annular projection 24 is an annular projection around the axis x provided on the outer peripheral side with respect to the side lip 30 and that projects outward. The outer peripheral annular projection 24 is formed such that, in the later-described in-use state, an annular gap is formed between an outer end 24a, which is an outer distal end, and the hub 52. The outer peripheral annular projection 24, for example, projects outward from an outer peripheral end portion of the base portion 23 and extends in or substantially in a shape of a blunted cone around or substantially around the axis x.

The elastic body piece 20 also includes a weir portion 25, which is an annular portion projecting toward the outer peripheral side, on the outer peripheral side with respect to the outer peripheral annular projection 24 as illustrated in, for example, FIG. 1. The weir portion 25 is formed such that the weir portion 25 projects, in a state where the hub seal 1 is attached to the outer ring 51, toward the outer peripheral side with respect to an outer end surface of the outer ring 51 as described later. The weir portion 25 is formed such that the weir portion 25 covers an outer peripheral end portion of the flange portion 13 of the reinforcing ring 10 as illustrated in, for example, FIG. 1. The elastic body piece 20 also includes a gasket portion 26 covering at least a part of an inner surface of the flange portion 13 of the reinforcing ring 10 as illustrated in, for example, FIG. 1. The gasket portion 26 annularly stretches around the axis x and is continuous with an inner peripheral end of the weir portion 25.

The elastic body piece 20 is integrally attached to the reinforcing ring 10. The above-described side lip 30, middle lip 21, main lip 22, base portion 23, outer peripheral annular projection 24, weir portion 25, and gasket portion 26 are portions of the elastic body piece 20 that are formed as one piece from the same material and integrally continuous. Examples of the elastic body of the elastic body piece 20 include a variety of rubber materials. Examples of the variety of rubber materials include synthetic rubbers such as nitrile rubber (NBR), hydrogenated nitrile rubber (H-NBR), acrylic rubber (ACM), and fluorine rubber (FKM).

It should be noted that the shape of the reinforcing ring 10 is not limited to the above-described shape and may be different. The reinforcing ring 10 may have, for example, a shape of a reinforcing ring of a known hub seal including a seal side lip, a middle lip, and a main lip. For example, the reinforcing ring 10 may include no flange portion 13. Moreover, the shape of the elastic body piece 20 is not limited to the above-described shape and may be different. The elastic body piece 20 may have, for example, a shape of an elastic body piece of a known hub seal including a seal side lip, a middle lip, and a main lip. For example, the elastic body piece 20 may include no outer peripheral annular projection 24. Moreover, for example, the elastic body piece 20 may include no weir portion 25.

Figure 3:
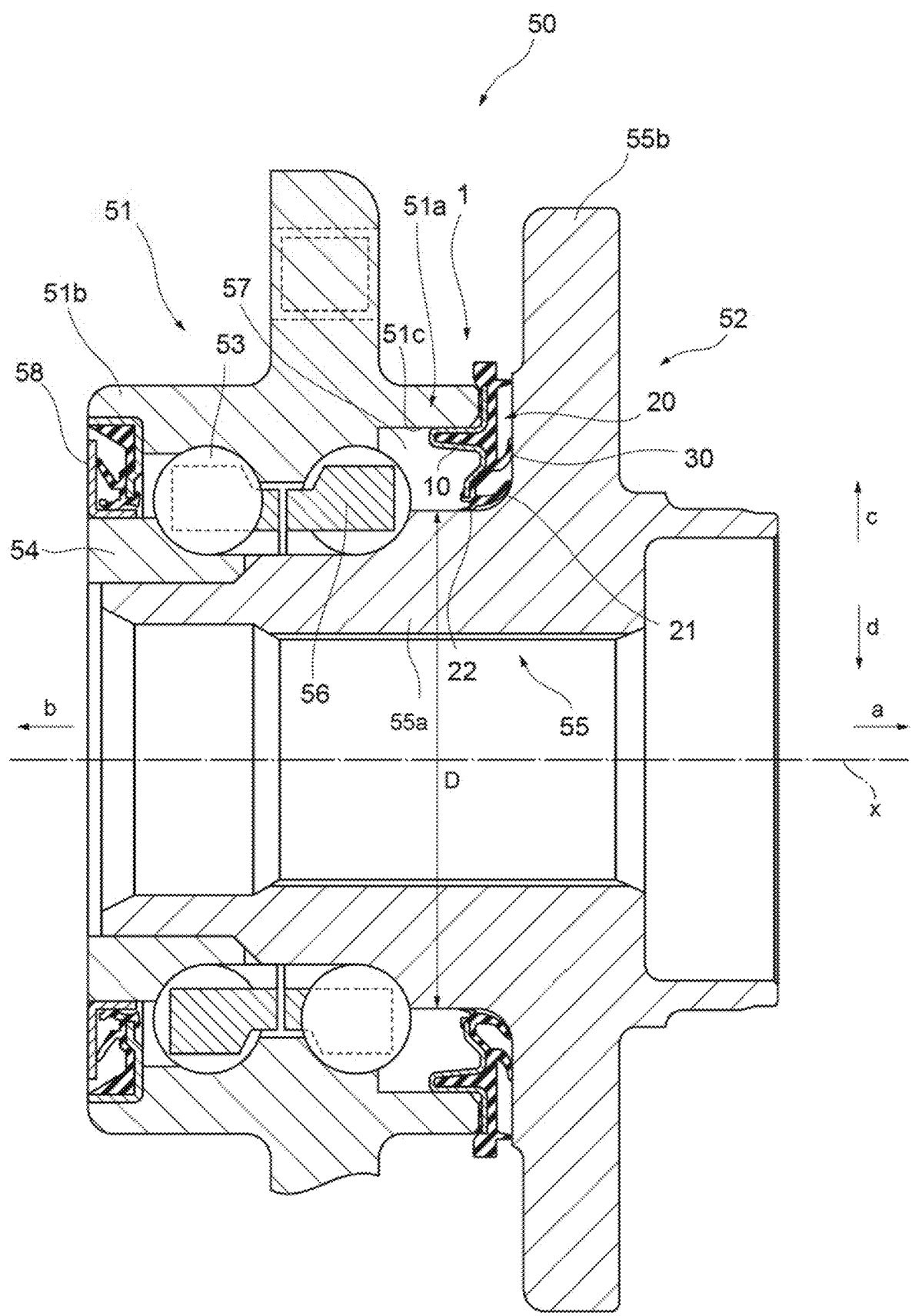
FIG. 3 is a cross-sectional view of the hub bearing in a cross section along the axis for illustrating an in-use state of the hub seal attached to the hub bearing.
Figure 4:
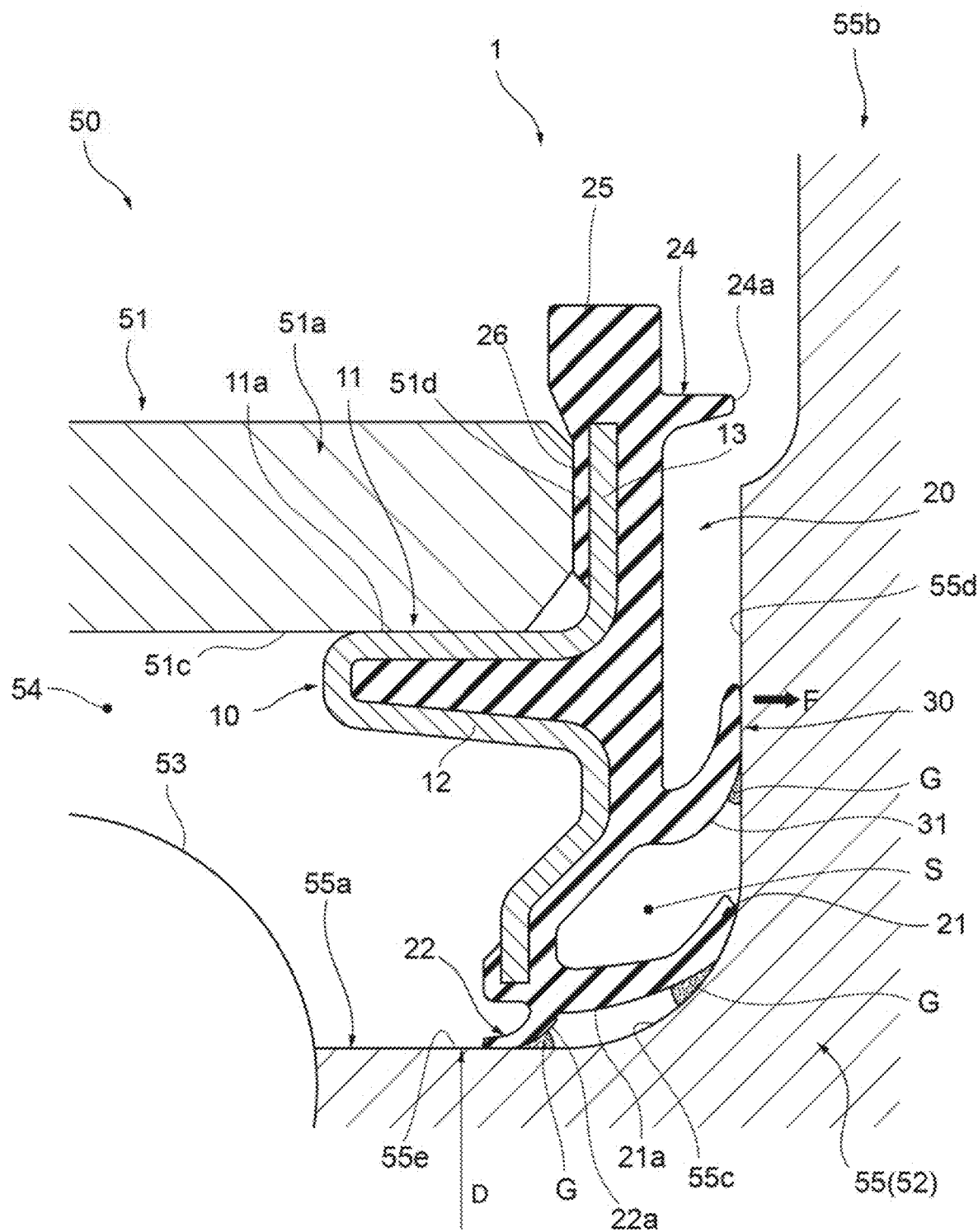
FIG. 4 is a partial enlarged cross-sectional view of a neighborhood of the hub seal in FIG. 3.

FIG. 3 is a cross-sectional view of the hub bearing 50 in a cross section along the axis x (hereinafter, also referred to simply as "cross section") for illustrating the in-use state of the hub seal 1 attached to the hub bearing 50 and FIG. 4 is a partial enlarged cross-sectional view of a neighborhood of the hub seal 1 in FIG. 3. It should be noted that in the illustrated example, an axis of the hub bearing 50 is in or substantially in alignment with the axis x of the hub seal 1. As illustrated in FIG. 3, the hub bearing 50, which is a conventional and known hub bearing, is to be installed in a vehicle such as an automobile or the like to support a wheel rotatably on an axle or a suspension. Specifically, as illustrated in FIG. 3, the hub bearing 50 includes: the annular outer ring 51, which is the outer peripheral member, around or substantially around the axis x; the hub 52, which is the inner peripheral member, around or substantially around the axis x and that is relatively rotatable with respect to the outer ring 51 and partially surrounded by outer ring 51; and a plurality of bearing balls 53 arranged between the outer ring 51 and the hub 52. In the in-use state in which the hub bearing 50 is attached to a vehicle or the like, the outer ring 51 is fixed and the hub 52 is relatively rotatable with respect to the outer ring 51. Specifically, the hub 52 includes an inner ring 54 and a hub ring 55 and the hub ring 55 includes the cylindrical or substantially cylindrical shaft portion 55a extending along the axis x and a wheel mounting flange 55b. The wheel mounting flange 55b is a portion stretching in a shape of a disc from an outer end of the shaft portion 55a toward the outer peripheral side and a portion on which a non-illustrated wheel is to be mounted with a plurality of hub bolts. The shaft portion 55a and the wheel mounting flange 55b are smoothly connected on the inner peripheral side and the transition portion 55c, which is a portion where the shaft portion 55a and the wheel mounting flange 55b are smoothly connected on the inner peripheral side, has a contour forming a smooth curve in or substantially in an arc in a cross section along the axis x. The inner ring 54 is fitted on an inner end portion of the shaft portion 55a of the hub ring 55 so that the bearing balls 53 are retained in a space between the outer ring 51 and the inner ring 54. The bearing balls 53 are retained by a retainer 56 in the space between the outer ring 51 and the hub 52.

The outer ring 51 has a through hole 57 extending in the axis-x direction, the shaft portion 55a of the hub ring 55 of the hub ring 55 in inserted in the through hole 57, and an annular space extending along the axis x is formed between the shaft portion 55a and the through hole 57. In this space, the bearing balls 53 are housed and retained by the retainer 56 as described above and the lubricant is applied or injected. The hub seal 1 is attached to the outer opening portion 51a of the outer ring 51 forming an opening at which the space between the shaft portion 55a and the through hole 57 is opened on the outer side, while another sealing device 58 is attached to an inner opening portion 51b of the outer ring 51 forming an opening at which the space between the shaft portion 55a and the through hole 57 is opened on the inner side. The hub seal 1 and the sealing device 58 are designed to seal the space between the shaft portion 55a and the inner ring 54 and the through hole 57, prevent the lubricant inside from leaking outside, and prevent foreign substances such as rainwater, muddy water, and dust from entering the inside. The sealing device 58 is a conventional and known sealing device and a detailed description thereof is omitted. It should be noted that the hub seal 1 is usable as the sealing device 58. A configuration where the hub seal 1 is used is not limited to the above-described configuration of the hub bearing 50.

As illustrated in FIGS. 3 and 4, the hub seal 1 is attached to the outer opening portion 51a of the outer ring 51. Specifically, the fitting portion 11 of the reinforcing ring 10 is pressed and fitted in the outer opening portion 51a of the outer ring 51 to fix the hub seal 1 to the outer ring 51. The outer peripheral surface 11a of the fitting portion 11 of the reinforcing ring 10 is in contact with an inner peripheral surface 51c of the outer opening portion 51a of the outer ring 51 so as to provide sealing between the reinforcing ring 10 and the outer ring 51. Moreover, in the in-use state, the reinforcing ring 10 is attached to the outer ring 51 with the flange portion 13 pressing the gasket portion 26 of the elastic body piece 20, which stretches on the inner side, against an outer end surface 51d, which forms an annular surface of the outer opening portion 51a facing the outer side, as illustrated in FIGS. 3 and 4. This causes the gasket portion 26 to be compressed between the outer end surface 51d and the flange portion 13 so as to improve hermeticity between the outer ring 51 and the hub seal 1. Moreover, the outer peripheral annular projection 24 and the weir portion 25 of the elastic body piece 20 are also designed to prevent the entry of a foreign substance.

In the in-use state, the distal end portion of the seal surface 31 of the side lip 30 is, at a portion (a contact width) corresponding to the above-described predetermined interference, in contact with a surface of the hub ring 55 with the hub ring 55 being slidable and the surface of the hub bearing 55 is, for example, a surface (the inner surface 55d) of the wheel mounting flange 55b facing the inner side. Moreover, the distal end portion of the middle lip 21 is, at a portion (a contact width) corresponding to the above-described predetermined interference, in contact with a surface of the hub ring 55 with the hub ring 55 being slidable and the surface of the hub ring 55 is, for example, the transition portion 55c. Moreover, the distal end portion of the main lip 22 is, at a portion (a contact width) corresponding to the above-described predetermined interference, in contact with a surface of the hub ring 55 with the hub ring 55 being slidable and the surface of the hub ring 55 is, for examples, an outer peripheral surface of the shaft portion 55a, which is the outer peripheral surface 55e. The side lip 30 and the middle lip 21 are designed to prevent a foreign substance from entering the through hole 57 and the main lip 22 is designed to prevent the lubricant from leaking from the inside of the through hole 57.

As described above, in the hub seal 1, the grease is applied to each of the seal surface 31 of the side lip 30, the seal surface 21a of the middle lip 21, and the seal surface 22a of the main lip 22. Thus, a grease G intervenes between respective contact surfaces of the side lip 30 and the inner surface 55d of the wheel mounting flange 55b in the in-use state as illustrated in FIG. 4. Likewise, the grease G intervenes between respective contact surfaces of the middle lip 21 and the transition portion 55c of the wheel mounting flange 55b and the grease G intervenes between respective contact surfaces of the main lip 22 and the outer peripheral surface 55e of the shaft portion 55a.

There are cases where the inner surface 55d of the wheel mounting flange 55b of the hub ring 55, with which the side lip 30 is to be in contact, is left with machining scratches formed due to machining during the manufacturing of the hub bearing 50. If the machining scratches are in a form of, for example, grooves with a certain directionality, a pumping action may occur on the basis of the machining scratches during the rotation of the hub 52 depending on the degree of surface roughness of the machining scratches. The pumping action may cause air, the grease G, and the like in a space S surrounded by the side lip 30, the wheel mounting flange 55b of the hub ring 55, the middle lip 21, and the base portion 23 to be discharged outside from the space S, causing a pressure in the space S to fall below a pressure of outside atmosphere to become negative. As the pressure in the space S becomes negative, the side lip 30 is attracted toward the wheel mounting flange 55b and the side lip 30 is further pressed against the inner surface 55d of the wheel mounting flange 55b. This may cause a disturbance in the rotation torque of the hub 52 or produce an abnormal noise.

As a result of dedicated studies about a relationship between the occurrence of the above-described disturbance in the rotation torque (hereinafter, also referred to as "torque disturbance") of the hub 52 and the lip reaction force F of the side lip 30 and the lip surface roughness R of the seal surface 31 of the side lip 30, the present inventors have found that the occurrence of the torque disturbance of the hub 52 has a relationship with the lip reaction force F of the side lip 30, the hub diameter D of the hub 52, and the lip surface roughness R of the seal surface 31 of the side lip 30. The present inventors have also found that a decrease in the sealing performance of the side lip 30 has a relationship with the lip reaction force F of the side lip 30, the hub diameter D of the hub 52, and the lip surface roughness R of the seal surface 31 of the side lip 30. The present disclosure is provided on the basis of these findings. In the following, description will be made on the findings and a hub seal and a method of manufacturing a hub seal according to the present disclosure based on the findings. It should be noted that the hub diameter D of the hub 52 is a diameter of a portion of the hub ring 55 associated with a dimension of the hub seal 1 in the radial direction. The hub diameter D of the hub 52 is, for example, a diameter of a portion of the hub ring 55 associated with setting of a dimension of a diameter of the side lip 30. Specifically, the hub diameter D is, for example, a diameter of the outer peripheral surface 55e of the shaft portion 55a of the hub ring 55 or a diameter at any position in the transition portion 55c of the wheel mounting flange 55b of the hub ring 55.

The present inventors presumed that a cause of a disturbance in the rotation torque of the hub and an abnormal noise occurring with the occurrence of a negative pressure in a space (see the space S) formed by the side lip in the in-use state of the hub seal was that an oil film of the grease fails to be formed on the contact surface (a sliding surface) in the seal surface of the side lip, so that the contact surface of the side lip was intermittently caught by the sliding hub and stick-slip occurred. The present inventors also presumed that a reason for the failure of the formation of an oil film of the grease on the contact surface (the sliding surface) in the seal surface of the side lip was related to a magnitude of the reaction force of the side lip and a magnitude of the surface roughness of the seal surface of the side lip. Accordingly, the present inventors produced a plurality of hub seals 1 with different values of the lip reaction force F of the side lip 30 and values of the lip surface roughness R of the seal surface 31 of the side lip 30 and conducted an evaluation test for the produced plurality of hub seals 1 to check for the occurrence of the torque disturbance of the hub and a decrease in sealing performance.

<Test Example> The lip reaction force F of the side lip 30 is a force in the axis-x direction that is to be applied by the side lip 30 to the inner surface 55d of the wheel mounting flange 55b of the hub ring 55 in the in-use state of the hub seal 1 as illustrated in FIG. 4. Elements of the side lip 30 that determine the lip reaction force F of the side lip 30 include, by way of example, an angle (a lip angle A) of an extending direction e of the side lip 30 relative to the radial direction, a length (a lip length L) of the side lip 30 in the extending direction, a thickness (a lip thickness DL) of the side lip 30 in a direction orthogonal to the extending direction, and a shape of a root of the side lip 30, which are illustrated in FIG. 5.

Figure 5:
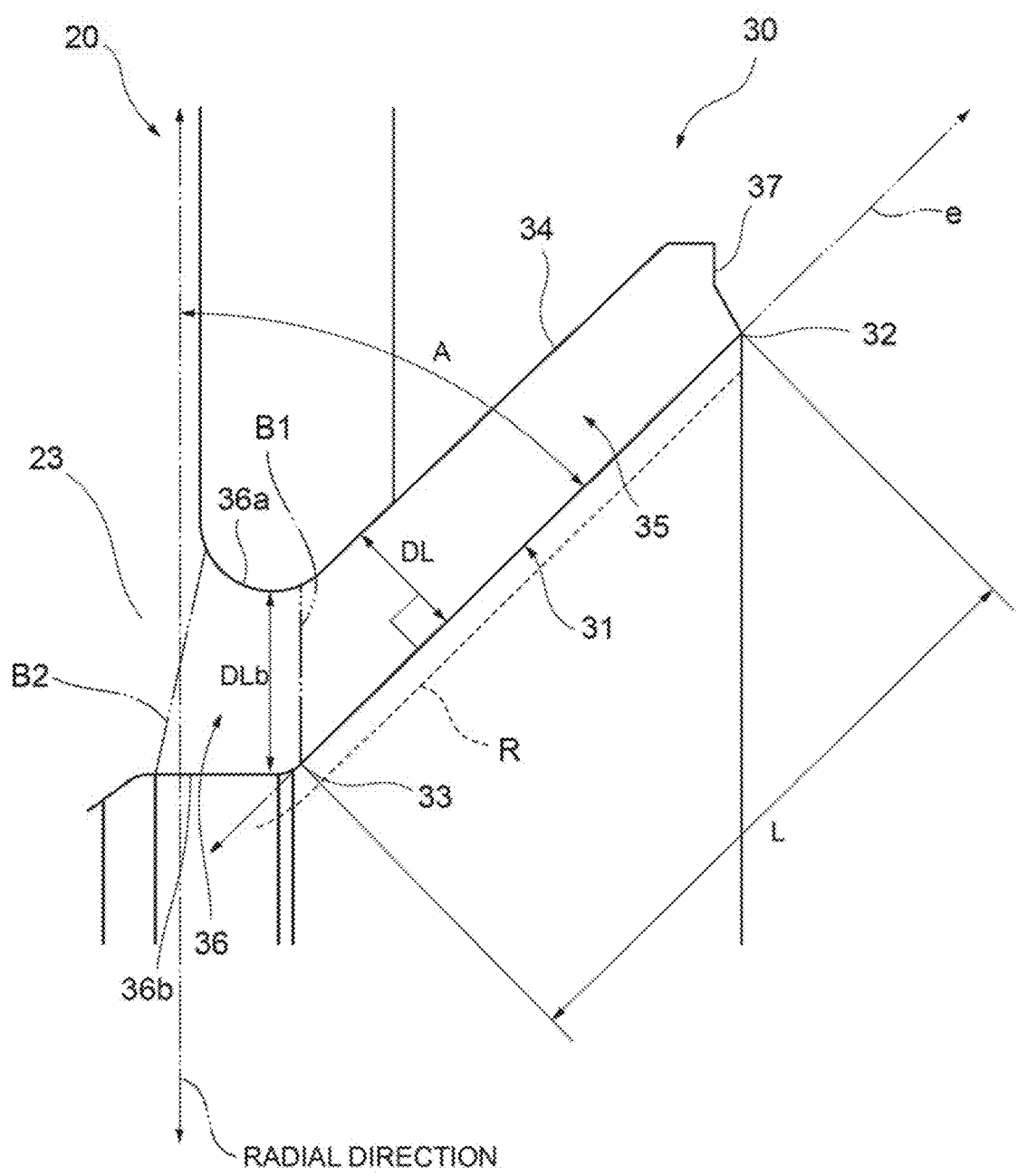
FIG. 5 is an enlarged view of the side lip of assistance in explaining an element that affects a lip reaction force of the side lip illustrated in FIG. 2.

As illustrated in FIG. 5, these elements of the side lip 30 are values in a cross section of the side lip 30 along the axis x. The extending direction e of the side lip 30 is a direction for an outline of the seal surface 31 in the cross section to extend. It should be noted that the outline of the seal surface 31 in the cross section of the side lip 30 is a straight line or a substantially straight line. Moreover, the lip length L is a length of the outline of the seal surface 31 in the cross section of the side lip 30 as illustrated in FIG. 5 and a length between a distal end (a seal-surface distal end 32) of the seal surface 31 of the side lip 30 and a root end (a seal-surface root end 33) of the seal surface 31 of the side lip 30. Moreover, the lip thickness DL of the side lip 30 is constant in the extending direction of the side lip 30 and is a distance between an outer peripheral surface 34, which is a surface of the side lip 30 facing the outer peripheral side, and the seal surface 31. It should be noted that an outline of the outer peripheral surface 34 in the cross section of the side lip 30 is a straight line or a substantially straight line. Moreover, the lip thickness DL of the side lip 30 is not necessarily constant in the extending direction of the side lip 30 and may be, for example, substantially constant in the extending direction of the side lip 30 or tapered.

As illustrated in FIGS. 2 and 5, the side lip 30 includes a lip distal end portion 35 and a lip root portion 36 and the shape of the root of the side lip 30, which is an element determining the lip reaction force F of the side lip 30, refers to a shape and dimension of a specific part of the lip root portion 36. An outer peripheral surface 36a of the lip root portion 36 is, for example, a surface curved to be smoothly connected to the base portion 23 and the outer peripheral surface 36a of the lip root portion 36 forms a curve projecting toward the inner peripheral side in the cross section as illustrated in FIG. 5. Moreover, as illustrated in FIG. 5, an inner peripheral surface 36b of the lip root portion 36 is a cylindrical surface or substantially cylindrical surface extending mainly along the axis x and opposite end portions of the inner peripheral surface 36b are smoothly connected to the seal surface 31 and the base portion 23, respectively, and curved. Specifically, the shape of the root of the side lip 30, which is an element determining the lip reaction force F of the side lip 30, includes, for example, a lip thickness DLb, which is a thickness of the lip root portion 36 in the radial direction, a curvature of the outer peripheral surface 36a, curvatures of the opposite end portions of the inner peripheral surface 36b, and the like. Moreover, in a case where the inner peripheral surface 36b is a curved surface, the shape of the root of the side lip 30, which is an element determining the lip reaction force F of the side lip 30, also includes a curvature of the inner peripheral surface 36b. It should be noted that the lip distal end portion 35 is a portion surrounded by the seal surface 31, the outer peripheral surface 34, and a seal distal edge 37 and the lip root portion 36, which is a portion connected to the base portion 23, is a portion between the lip distal end portion 35 and the base portion 23. Moreover, the thickness DLb of the lip root portion 36 in the radial direction is a thickness in the radial direction at the innermost peripheral position in the outer peripheral surface 36a of the lip root portion 36 as illustrated in, for example, FIG. 5. It should be noted that an imaginary line B1 in FIG. 5 is an imaginary boundary between the lip distal end portion 35 and the lip root portion 36 and an imaginary line B2 in FIG. 5 is an imaginary boundary between the lip root portion 36 and the base portion 23.

As test examples that were to be subjected to the above-described evaluation test, 25 hub seals 1 (Test Examples 1 to 25) having different lip reaction forces F were produced. The lip angle A, the lip thickness DL, the lip length L, and the shape of the lip root portion 36, which are elements of the side lip 30 determining the above-described lip reaction force F, were independently set at various values or shapes, thereby making the lip reaction forces F of Test Examples 1 to 25 different from one another. Moreover, the portions other than the side lips 30 of Test Examples 1 to 25 were the same as one another. Incidentally, differences such as manufacturing variations among the portions other than the side lips 30 of Test Examples 1 to 25 were accepted.

Figure 6:
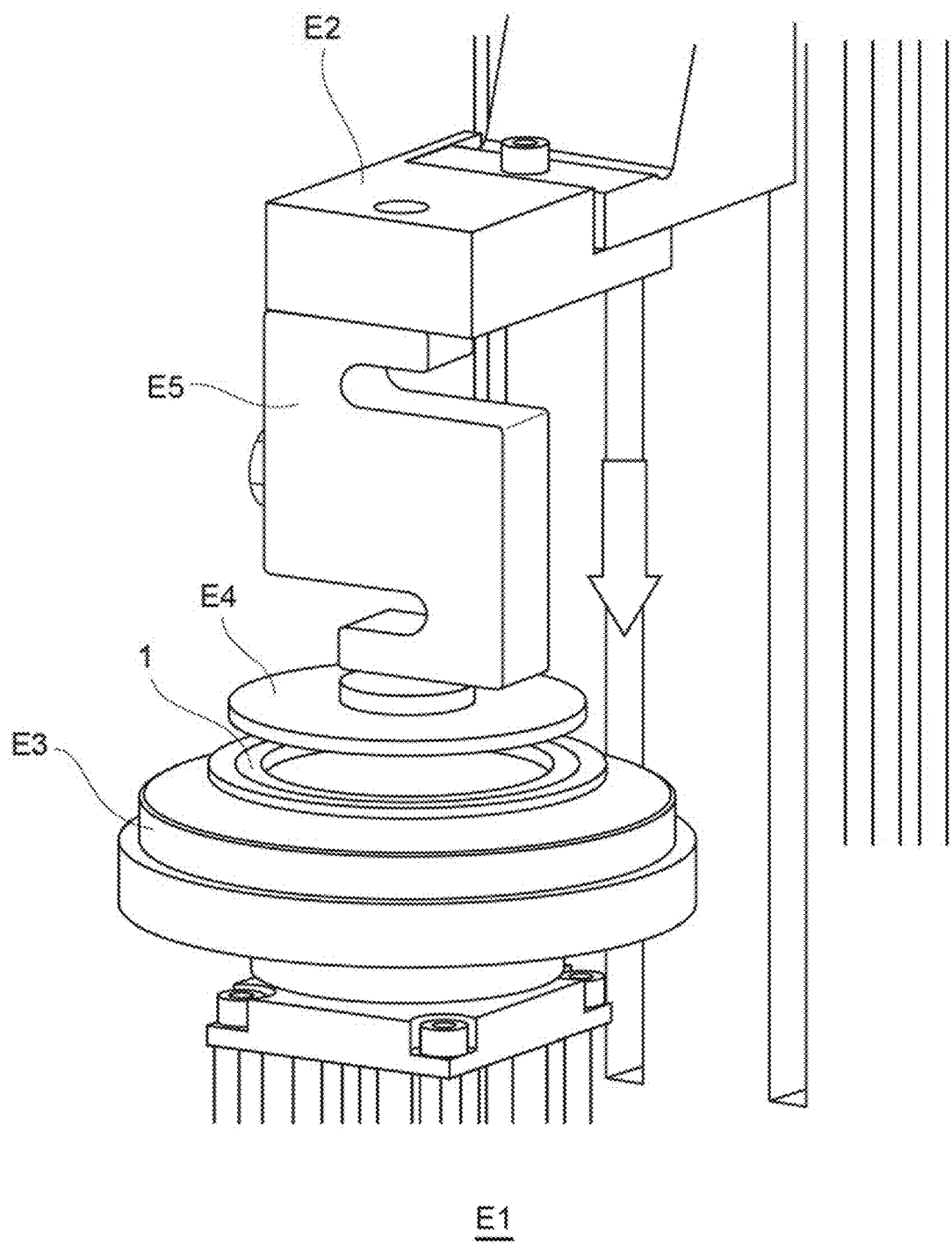
FIG. 6 is a diagram illustrating a schematic configuration of a reaction force measuring device that measures a reaction force of a side lip of a hub seal according to a test example.

A reaction force measuring device E1 illustrated in FIG. 6 was used to measure the lip reaction forces F of Test Examples 1 to 25. Specifically, the hub seal 1 (Test Examples 1 to 25) was fixed to a lower arm E3, a load cell E5 attached with a disc E4 was attached to an upper arm E2, the disc E4 was brought into contact with the side lip 30 of the hub seal 1 by moving the upper arm E2 toward the lower arm E3, and, at this time, a force received by the disc E4 from the side lip 30 was measured using the load cell E5 to measure the lip reaction force F. It should be noted that the lower arm E3 was fixed with the hub seal 1 in a posture causing the side lip 30 to face the upper arm E2. Moreover, the lip reaction force F to measure was the lip reaction force F when the contact width of the side lip 30 relative to the disc E4 reached a width corresponding to the interference of the side lip 30 in the above-described in-use state of the hub seal 1.

<Evaluation Test>

Figure 7:
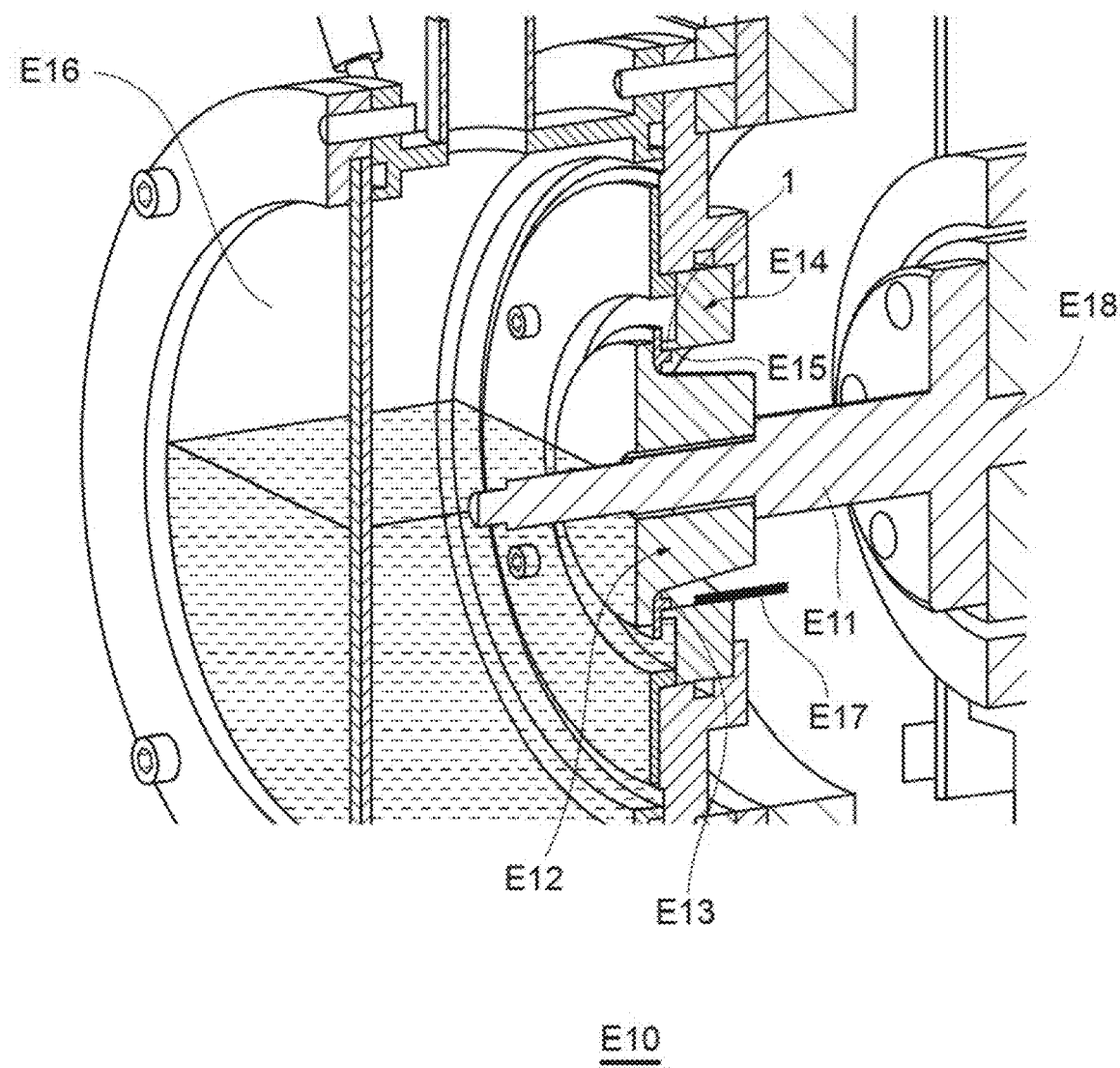
FIG. 7 is a diagram illustrating a schematic configuration of a testing device that conducts an evaluation test of the hub seal according to the test example.

The evaluation test was conducted for above-described Test Examples 1 to 25. A testing device E10 illustrated in FIG. 7 was used to conduct the evaluation test. The testing device E10 includes a rotary shaft E11a rotatable around an axis and a distal end of the rotary shaft E11 is attached with a hub dummy E12. The hub dummy E12 has a surface E13 that is the same in shape as the inner surface 55d and the transition portion 55c of the wheel mounting flange 55b of the hub ring 55 and the outer peripheral surface 55e of the shaft portion 55a of the hub ring 55, with which the side lip 30, the middle lip 21, and the main lip 22 are in contact in the in-use state of the hub seal 1 illustrated in FIG. 4. Moreover, the testing device E10 includes an outer ring dummy E14 and the outer ring dummy 14 includes a fixation portion E15, which is a portion having the same shape as the outer opening portion 51a of the outer ring 51 in which the reinforcing ring 10 is press-fitted in the in-use state of the hub seal 1 illustrated in FIG. 4. That is to say, the fixation portion 15 has a surface having the same shape as the inner peripheral surface 51c and the outer end surface 51d of the outer opening portion 51a of the outer ring 51. The hub seal 1 is to be attached between the outer ring dummy E14 and the hub dummy E12. Specifically, the reinforcing ring 10 is to be press-fitted in the fixation portion E15 of the outer ring dummy E14 with the side lip 30, the middle lip 21, and the main lip 22 being in contact with the surface E13 of the hub dummy E12. At this time, a contact width of the side lip 30 relative to the surface E13 is a width corresponding to the interference of the side lip 30 in the above-described in-use state of the hub seal 1, a contact width of the middle lip 21 relative to the surface E13 is a width corresponding to the interference of the middle lip 21 in the above-described in-use state of the hub seal 1, a contact width of the main lip 22 relative to the surface E13 is a width corresponding to the interference of the main lip 22 in the above-described in-use state of the hub seal 1. This causes the inside of the testing device E10 to be sealed. In the testing device E10, a sealed head E16 forming a sealed space for containing muddy water is formed outside the outer ring dummy E14 and the hub dummy E12 and muddy water is sealed in the sealed head E16. Moreover, a water leakage sensor E17 is attached to an inner peripheral surface of the outer ring dummy E14 at a position near the hub seal 1. In a case where the muddy water leaks into the inside over the hub seal 1, the water leakage sensor E17 detects the leaking muddy water. It should be noted that the muddy water leaking over the hub seal 1 is accumulated at a position on a lower portion of the inner peripheral surface of the outer ring dummy E14 and near the hub seal 1. Moreover, the torque of the rotary shaft E11 is to be detected using a torque gauge E18. For example, the torque gauge E18 detects the torque of the rotary shaft E11 in a predetermined cycle.

A detection result of the water leakage sensor E17 was checked after the elapse of test time and it was checked whether or not the water leakage sensor E17 worked during the test. In a case where the water leakage sensor E17 worked during the test, the muddy water was determined to leak and the sealing performance was evaluated as being decreased. Moreover, in a case where a detection value of the torque gauge E18 or a calculation value based on the detection value was larger than a predetermined threshold, torque disturbance was determined to occur. It is determined whether or not torque disturbance occurs by, for example, storing detection values of the torque gauge E18 detected during the predetermined test time and calculating the degree of a disturbance relative to a predetermined threshold in the stored detection values detected during the predetermined test time or calculation values based on the detection values. For example, out of torque detection values detected by the torque gauge E18 in a predetermined sampling cycle during predetermined torque measurement time or calculation values based on the torque detection values, a rate (a torque stability) of a torque detection value or a calculation value smaller than a predetermined threshold is calculated and torque disturbance is determined to occur in a case where the rate (the torque stability) is equal to or less than another predetermined threshold. Alternatively, it may be determined whether or not torque disturbance occurs by obtaining an average value of the torque detection values detected by the torque gauge E18 in the predetermined sampling cycle or the calculation values based on the torque detection values and comparing the average value with still another predetermined threshold. The above-described calculation values based on the torque detection values are, for example, standard deviations of the torque detection values detected by the torque gauge E18 in the predetermined sampling cycle. The above-described method of determining whether or not torque disturbance occurs is merely by way of example and it may be determined whether or not torque disturbance occurs by another method.

Figure 8:
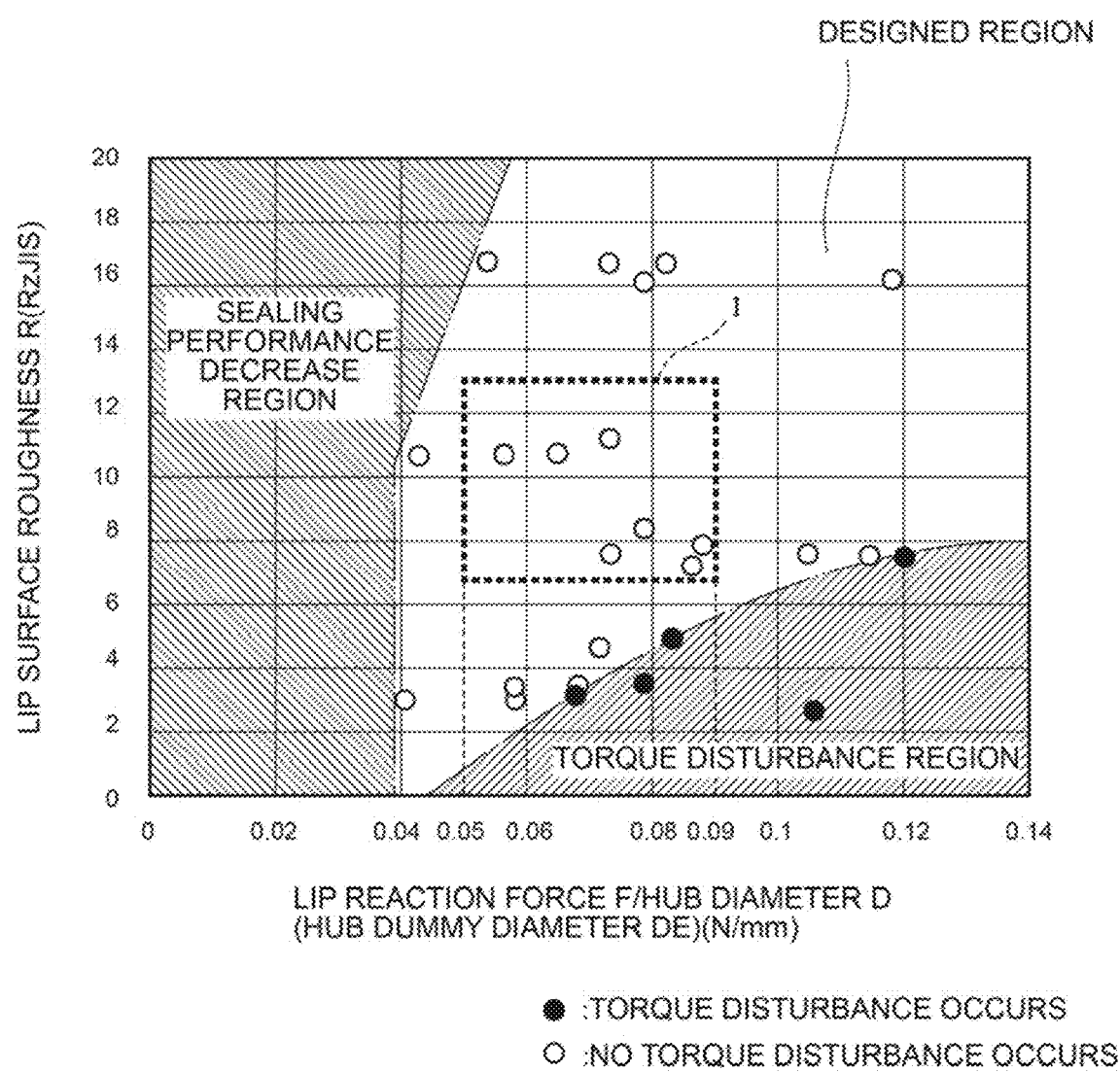
FIG. 8 is a diagram illustrating a graph showing a relationship between a value of the lip reaction force per unit of length and a lip surface roughness of the side lip of the hub seal according to the test example.

A graph in FIG. 8 shows evaluation test results of Test Examples 1 to 25. The graph in FIG. 8 also shows a value of the lip reaction force F per unit of length of the side lip 30 and the lip surface roughness R of the side lip 30 of each of Test Examples 1 to 25. The graph in FIG. 8 also shows relationships between the value of the lip reaction force F per unit of length of the side lip 30 and the lip surface roughness R of the side lip 30 of Test Examples 1 to 25. It should be noted that the value of the lip reaction force F per unit of length of the side lip 30 is a value (lip reaction force F/hub dummy diameter DE) given by dividing the lip reaction force F of the side lip 30 by a value of a diameter (a hub dummy diameter DE) of a portion of the surface E13 of the hub dummy E12 corresponding to the outer peripheral surface 55e of the shaft portion 55a of the hub ring 55. It should be noted that the hub dummy diameter DE is a value corresponding to the hub diameter D. In the graph in FIG. 8, the horizontal axis represents the value of the lip reaction force F/hub dummy diameter DE of each of Test Examples 1 to 25 and the vertical axis represents the value of the lip surface roughness R of each of Test Examples 1 to 25. It should be noted that in FIG. 8, an open circle is a plot corresponding to a test example in which no torque disturbance occurred and a filled circle is a plot corresponding to a test example in which torque disturbance occurred.

It has been demonstrated from the results of the present evaluation test that a torque disturbance region can be set and a sealing performance decrease region can be set as illustrated in FIG. 8. The torque disturbance region is a region where torque disturbance is supposed to occur and the side lip 30 having a value within the torque disturbance region can be determined to be the side lip 30 accompanied by the occurrence of torque disturbance. Moreover, the sealing performance decrease region is a region where the sealing performance is supposed to decrease and the side lip 30 having a value within the sealing performance decrease region can be determined to be the side lip 30 that lets muddy water leak and decreases in sealing performance. A reduction in the value of the lip reaction force F leads to a decrease in sealing performance and an increase in the value of the lip surface roughness R leads to a decrease in sealing performance.

As seen from the above, it has been demonstrated from the results of the present evaluation test that there is a relationship between the value per unit of length of the lip reaction force F of the side lip 30 (lip reaction force F/hub dummy diameter DE) and the lip surface roughness R of the side lip 30 and the occurrence of torque disturbance and there is a relationship between the value per unit of length of the lip reaction force F of the side lip 30 and the lip surface roughness R of the side lip 30 and a decrease in sealing performance. It has also been demonstrated that the region where torque disturbance occurs can be set with respect to the value per unit of length of the lip reaction force F of the side lip 30 and the value of the lip surface roughness R of the side lip 30 and the region where the sealing performance decreases can be set with respect to the value per unit of length of the lip reaction force F of the side lip 30 and the value of the lip surface roughness R of the side lip 30.

It is possible to set the torque disturbance region and the sealing performance decrease region on the basis of the value of the lip reaction force F per unit of length of the side lip 30 (lip reaction force F/hub dummy diameter DE) obtained by the evaluation test as described above and the value of the lip surface roughness R of the side lip 30. The torque disturbance region is set by plotting the evaluation test results on a graph as illustrated in FIG. 8 and setting a region containing all the plots of the occurrence of torque disturbance. It is possible to set a boundary of the torque disturbance region by joining the plots of the occurrence of torque disturbance with a smooth line. Moreover, it is possible to set the boundary of the torque disturbance region by drawing a line in such a manner that the line includes plots of the occurrence of torque disturbance and shows that the value of the lip surface roughness R of the side lip 30 becomes larger as the value per unit of length of the lip reaction force F of the side lip 30 becomes larger. This is because stick-slip is speculated to be more likely to occur with an increase in the lip reaction force F and, accordingly, the boundary of the torque disturbance region is speculated to form a line as the line shows that the value of the lip surface roughness R of the side lip 30 becomes larger as the value per unit of length of the lip reaction force F of the side lip 30 becomes larger. The boundary of the torque disturbance region is, for example, an inclined straight line or, for example, a quadric curve where the slope of a tangent decreases with an increase in the value per unit of length of the lip reaction force F. The boundary of the torque disturbance region is limited to neither an inclined straight line nor the above-described quadric curve and may form any of various lines on the basis of plots of the occurrence of torque disturbance.

The sealing performance decrease region is set by plotting the evaluation test results on a graph as illustrated in FIG. 8 and setting a region containing all the plots of the occurrence of a decrease in sealing performance. It is possible to set a boundary of the sealing performance decrease region by joining the plots of the occurrence of a decrease in sealing performance with a smooth line. Moreover, it is possible to set the boundary of the sealing performance decrease region by drawing a line in such a manner that the line includes plots of the occurrence of a decrease in sealing performance and shows that the value per unit of length of the lip reaction force F of the side lip 30 becomes larger as the value of the lip surface roughness R of the side lip 30 becomes larger. Since it is speculated that the muddy water is less likely to enter with an increase in the lip reaction force F and the muddy water is more likely to enter with an increase in the lip surface roughness R, it is speculated that the boundary of the sealing performance decrease region forms a line as the line shows that the value per unit of length of the lip reaction force F of the side lip 30 becomes larger as the value of the lip surface roughness R of the side lip 30 becomes larger. The boundary of the sealing performance decrease region is, for example, an inclined straight line or a quadric curve where the slope of a tangent decreases with an increase in the value of the lip surface roughness R of the side lip 30. The boundary of the sealing performance decrease region is limited to neither an inclined straight line nor the above-described quadric curve and may form any of various lines on the basis of plots of the occurrence of a decrease in sealing performance.

It should be noted that none of the side lips 30 of Sample Examples 1 to 25 was evaluated as the occurrence of a decrease in sealing performance as illustrated in FIG. 8. In such a case, a plot assumed to be the closest to the sealing performance decrease region is selected from among the evaluation test results for each lip surface roughness R or for each predetermined range of the lip surface roughness R and the sealing performance decrease region can be set on the basis of the selected plot. For example, the sealing performance decrease region can be set by joining the plots selected as described above with a smooth line. Moreover, the sealing performance decrease region can be set by moving each of the plots selected as described above by a predetermined width in a direction to approach the sealing performance decrease region and then joining the plots with a smooth line. Specifically, similarly to, for example, the boundary of the sealing performance decrease region written in FIG. 8, the plot having the smallest value per unit of length of the lip reaction force F in each of groups of the plots having close lip surface roughnesses R is selected from among the evaluation test results (plots) and a line passing on a side where the values per unit of length of the lip reaction force F are smaller than the selected plots by a predetermined width can be defined as the boundary of the sealing performance decrease region.

As illustrated in FIG. 8, setting the torque disturbance region and the sealing performance decrease region makes it possible to set a designed region, which is a range of the value per unit of length of the lip reaction force F of the side lip 30 and the lip surface roughness R of the side lip 30 and where neither torque disturbance nor a decrease in sealing performance occurs. The designed region is a region of the value per unit of length of the lip reaction force F of the side lip 30 and the lip surface roughness R of the side lip 30 that are included in neither the torque disturbance region nor the sealing performance decrease region. Moreover, a specific region (a target region) within the designed region may be set as a range of the value per unit of length of the lip reaction force F of the side lip 30 and the lip surface roughness R of the side lip 30. The specific target region is, for example, a region within the designed region spaced by a predetermined width from each of the boundary of the torque disturbance region and the boundary of the sealing performance decrease region. The specific target region is also, for example, a range of the specific value per unit of length of the lip reaction force F within the designed region and a range of the specific lip surface roughness R within the designed region.

Specifically, for example, the side lip 30 in a region (a target region I) indicated by a broken frame in FIG. 8 prevents the occurrence of torque disturbance and does not decrease in sealing performance and, accordingly, the target region I can be set as a region of the side lip 30 that prevents the occurrence of torque disturbance and does not decrease in sealing performance. For example, a region where the value of the "lip reaction force F/hub dummy diameter DE" is in a range from 0.05 N/mm to 0.09 N/mm and the value of the lip surface roughness R is in a range from RzJIS 10 µm−α to RzJIS 10 µm+α can be set as the target region I. It should be noted that α is, for example, a tolerance during the forming of the side lip 30 and is a value provided by taking a possible variation in the lip surface roughness R attributed to the manufacturing of the side lip 30 into consideration.

On the basis of the above-described results of the evaluation test, the hub seal 1 according to the embodiment of the present disclosure includes the side lip 30 in which the value of the "lip reaction force F/hub diameter D", which is a value per unit of length of the lip reaction force F of the side lip 30, and the lip surface roughness R of the side lip 30 are within the designed region. Specifically, for example, the hub seal 1 according to the embodiment of the present disclosure includes the side lip 30 in which the value of the lip reaction force F/hub diameter D and the lip surface roughness R of the side lip 30 are within the target region I illustrated in FIG. 8. That is to say, the value of the "lip reaction force F/hub diameter D" of the side lip 30 of the hub seal 1 is in a range from 0.05 N/mm to 0.09 N/mm. The lip reaction force F is adjusted on the basis of at least one of the lip angle A, the lip thickness DL, the lip length L, and the shape of the lip root portion 36 of the side lip 30 and the side lip 30 of the hub seal 1 is shaped such that the value of the "lip reaction force F/hub diameter D" falls within a range from 0.05 N/mm to 0.09 N/mm. The side lip 30 of the hub seal 1 is shaped such that the value of the "lip reaction force F/hub diameter D" falls within a range from 0.05 N/mm to 0.09 N/mm by adjusting, for example, at least one value of the lip angle A, the lip thickness DL, the lip length L, and the shape of the lip root portion 36 of the side lip 30 Moreover, the value of the lip surface roughness R of the side lip 30 of the hub seal 1 is in a range from RzJIS 10 µm−α to RzJIS 10 µm+α. α is a value provided by taking a possible variation in the lip surface roughness R attributed to the manufacturing of the side lip 30 into consideration as described above and, for example, α=3 µm.

Figure 9:
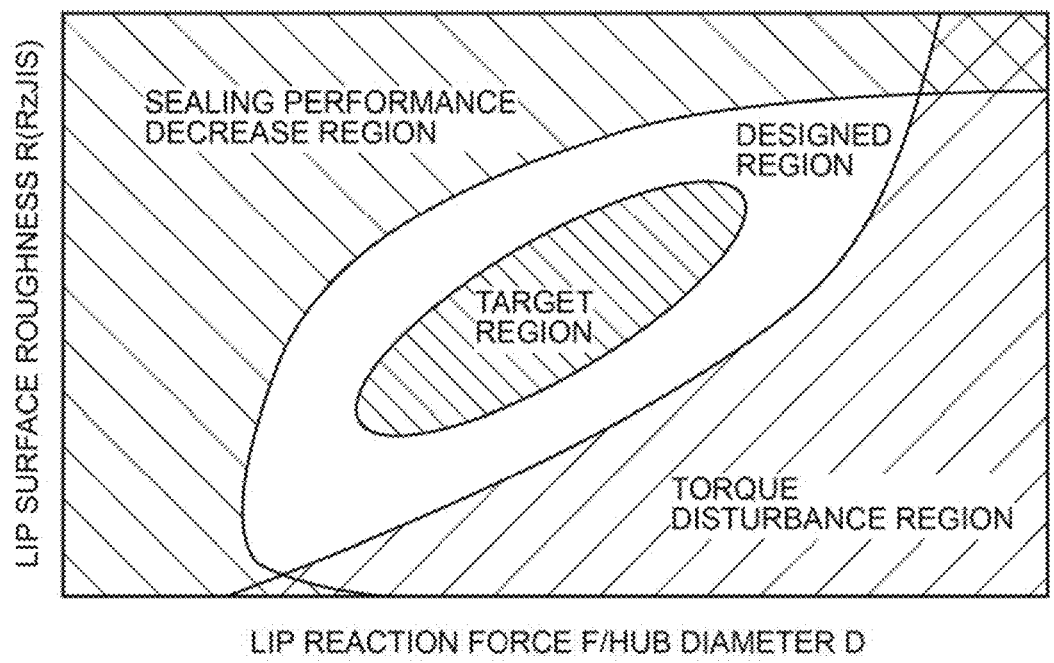
FIG. 9 is a diagram illustrating another graph showing the relationship between the value of the lip reaction force per unit of length and the lip surface roughness of the side lip of the hub seal according to the test example.

As described above, it is possible to define a variety of boundaries of the torque disturbance region and boundaries of the sealing performance decrease region on the basis of the results of the evaluation test, on the basis of a design idea about safety factor, or the like, and on the basis of other elements such as the shape of the hub seal 1 and define a variety of designed regions, accordingly. Moreover, the target region can likewise be varied. For example, the torque disturbance region, the sealing performance decrease region, the designed region, and the target region as illustrated in FIG. 9 may be defined.

As for the adjustment of the lip reaction force F of the side lip 30, for example, the lip reaction force F increases more at the lip angle A closer to 90 degrees. The lip reaction force F also increases with an increase in the lip thickness DL. The lip reaction force F also increases with an increase in the lip length L. Incidentally, in view of a relationship with the lip thickness DL or the elastic module of the side lip 30, it is speculated that the reaction force decreases once the lip length L exceeds a predetermined length. Moreover, changing the shape of the lip root portion 36 to a shape that increases the elastic module of the lip root portion 36 enhances the rigidity of the lip root portion 36 to increase the lip reaction force F. The elastic module of the lip root portion 36 is supposed to be increased by, for example, increasing the lip thickness DLb of the lip root portion 36.

<Method of Manufacturing Hub Seal 1>

As described above, the side lip 30 having the value of the "lip reaction force F/hub diameter D" and the lip surface roughness R within the designed region illustrated in FIG. 8 prevents the occurrence of torque disturbance or reduces the occurrence of torque disturbance even though the pressure in the space S becomes negative, so that the production of an abnormal noise is prevented or the production of an abnormal noise is reduced and a decrease in sealing performance is prevented or a decrease in the sealing performance is reduced. According to the method of manufacturing a hub seal according to the embodiment of the present disclosure, a designed region is set in advance by conducting the above-described evaluation test, the value of the "lip reaction force F/hub diameter D" and the lip surface roughness R within the designed region set in advance are selected during an elastic body piece formation process to form the elastic body piece 20 of the hub seal 1 from an elastic body, the side lip 30 having the selected value of the "lip reaction force F/hub diameter D" and lip surface roughness R is designed, and the designed side lip 30 is manufactured. This causes the side lip 30 to be in a shape to reduce torque disturbance and a decrease in sealing performance. Moreover, it is possible to design, easily and in a short period of time, the hub seal 1 including the side lip 30 in the shape to reduce torque disturbance and a decrease in sealing performance.

Moreover, according to the method of manufacturing a hub seal, the side lip 30 having the above-described selected value of the "lip reaction force F/hub diameter D" and lip surface roughness R is designed by adjusting the lip reaction force F of the side lip 30 at least one of the lip angle A, the lip length L, the lip thickness DL, the lip surface roughness R, and the shape of the lip root portion 36 of the side lip 30.

Specifically, for example, according to the method of manufacturing a hub seal, the shape of the side lip 30 is designed as a shape causing the value of the "lip reaction force F/hub diameter D" and the lip surface roughness R of the side lip 30 to fall within the target region I illustrated in FIG. 8. More specifically, for example, according to the method of manufacturing a hub seal, the side lip 30 is designed such that the value of the "lip reaction force F/hub diameter D" of the side lip 30 is in a range from 0.05 N/mm to 0.09 N/mm and the lip surface roughness R of the side lip 30 is in a range from RzJIS 10 μm−α to RzJIS 10 μm+α.

Figure 10:
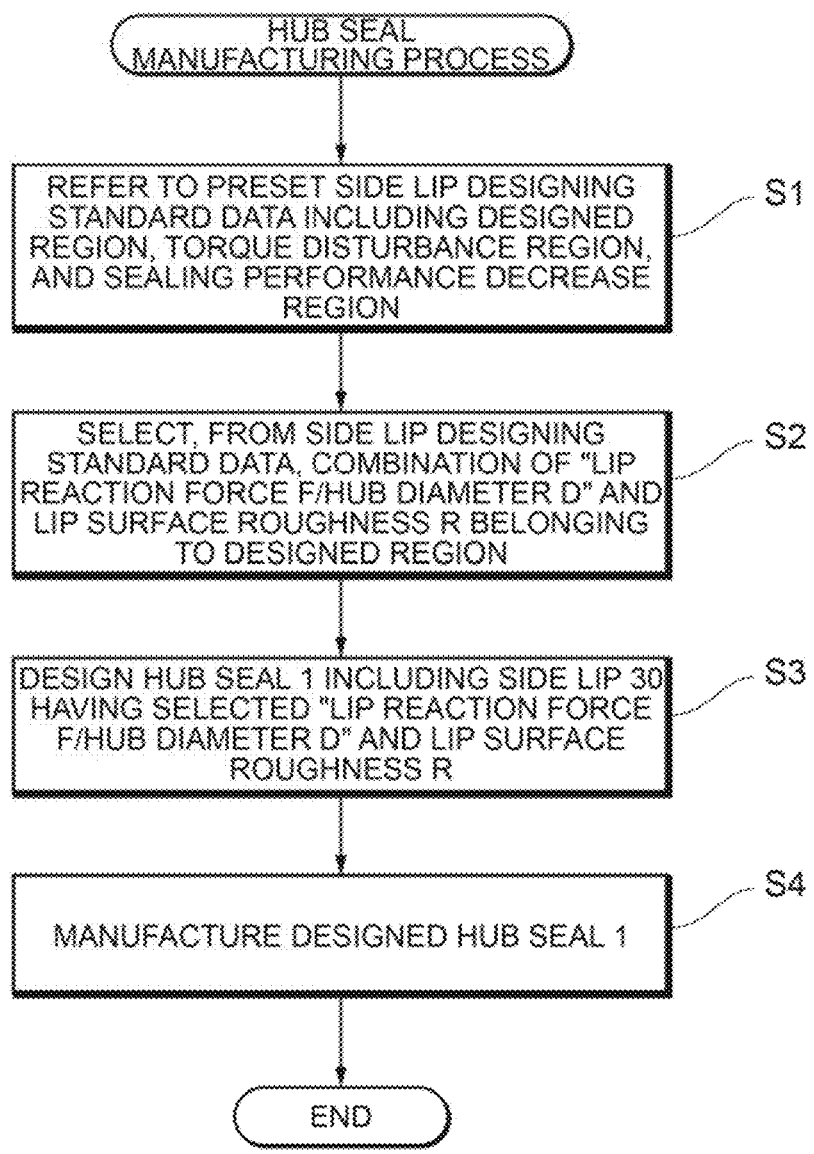
FIG. 10 is a diagram illustrating a flowchart of a method of manufacturing a hub seal according to an embodiment of the present disclosure.

A specific description will be made below on a method of manufacturing the hub seal 1. FIG. 10 illustrates a flowchart of a hub seal manufacturing process to manufacture the hub seal 1.

As illustrated in FIG. 10, in the hub seal manufacturing process, reference is first made to side lip designing standard data set in advance on the basis of the lip reaction force F/hub diameter D and the lip surface roughness R and that includes the designed region, the torque disturbance region, and the sealing performance decrease region (Step S1). The side lip designing standard data is data holding a combination of the "lip reaction force F/hub diameter D" and the lip surface roughness R belonging to the designed region, a combination of the "lip reaction force F/hub diameter D" and the lip surface roughness R belonging to the torque disturbance region, and a combination of the "lip reaction force F/hub diameter D" and the lip surface roughness R belonging to the sealing performance decrease region and, visually, data illustrated in FIGS. 8 and 9.

Subsequently, in Step S2, the combination of the "lip reaction force F/hub diameter D" and the lip surface roughness R belonging to the designed region is selected from the side lip designing standard data. Subsequently, the hub seal 1 including the side lip 30 having the "lip reaction force F/hub diameter D" and the lip surface roughness R selected in Step S2 (Step S3). Subsequently, the hub seal 1 designed in Step 3 is manufactured (Step S4).

Figure 11:
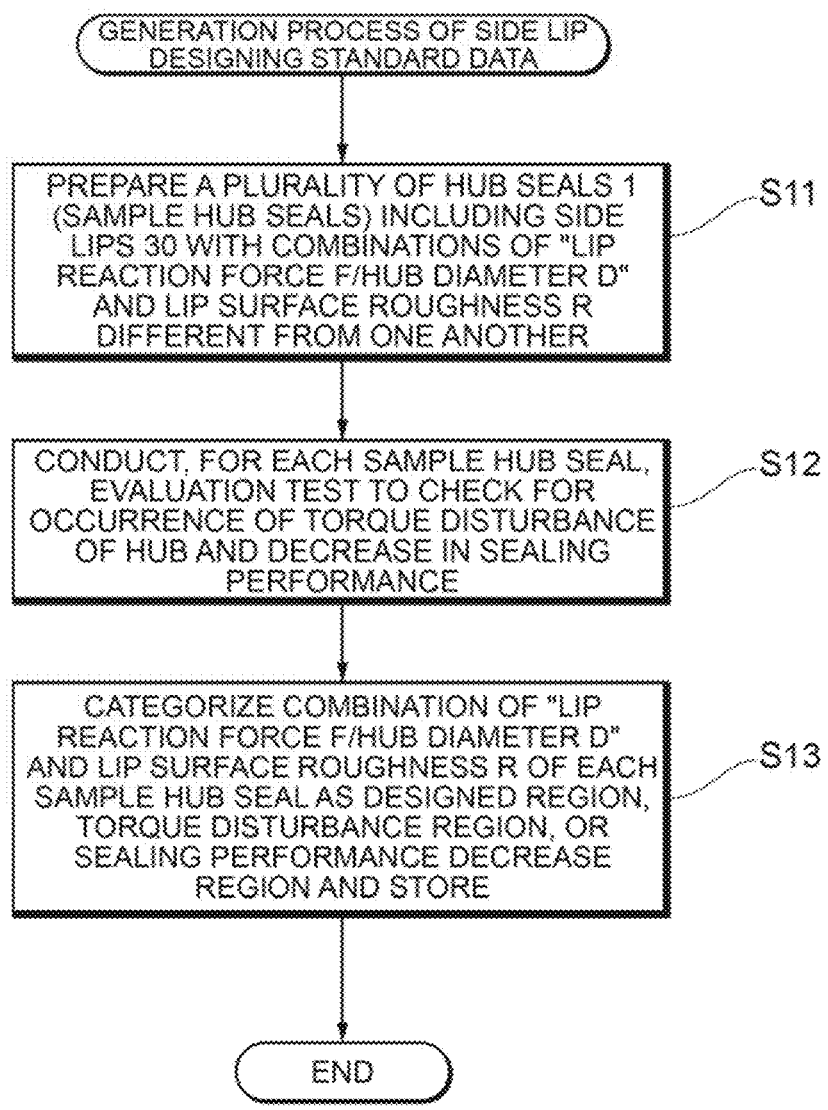
FIG. 11 is a diagram illustrating a flowchart of a generation process of side lip designing standard data that is to be referred to during a hub seal manufacturing process in FIG. 10.

Subsequently, description will be made on a generation process of the side lip designing standard data that is to be referred to in Step S1 of the hub seal manufacturing process illustrated in FIG. 10. The generation process of the side lip designing standard data is performed in advance before the hub seal manufacturing process illustrated in FIG. 10. The side lip designing standard data generated once through the generation process of the side lip designing standard data is usable every time the hub seal manufacturing process is performed. FIG. 11 illustrates a flowchart illustrating the generation process of the side lip designing standard data that is to be referred to in Step S1 of the hub seal manufacturing process illustrated in FIG. 10.

In the generation process of the side lip designing standard data, a plurality of hub seals 1 (sample hub seals) including the side lips 30 having combinations of the "lip reaction force F/hub diameter D" and the lip surface roughness R different from one another are prepared (Step S11). Subsequently, the sample hub seals prepared in Step S11 are each subjected to the above-described evaluation test to check for the occurrence of torque disturbance and a decrease in sealing performance of the hub (Step S12).

Subsequently, from results of the evaluation test in Step S12, a combination of the "lip reaction force F/hub diameter D" and the lip surface roughness R of each of the sample hub seals is categorized as the designed region, the torque disturbance region, or the sealing performance decrease region and stored (Step S13). The side lip designing standard data is thus generated. The categorization in Step S13 is performed by plotting the "lip reaction force F/hub diameter D" and the lip surface roughness R of each of the sample hub seals on a graph of the "lip reaction force F/hub diameter D" and the lip surface roughness R as illustrated in FIGS. 8 and 9, associating the evaluation result of each of the sample hub seals in Step S12 with a corresponding plot, and setting each of the boundary of the torque disturbance region and the boundary of the sealing performance decrease region to set the torque disturbance region, the sealing performance decrease region, and the designed region as described above. This causes the combination of the "lip reaction force F/hub diameter D" and the lip surface roughness R of each of the sample hub seals to be categorized as the designed region, the torque disturbance region, or the sealing performance decrease region. It should be noted that a method of categorizing the combinations of the "lip reaction force F/hub diameter D" and the lip surface roughness R of the sample hub seals as the designed region, the torque disturbance region, or the sealing performance decrease region is not limited to the above-described visual method. For example, the method of categorizing the combinations of the "lip reaction force F/hub diameter D" and the lip surface roughness R of the sample hub seals as the designed region, the torque disturbance region, or the sealing performance decrease region may be a method based on calculation.

Figure 12:
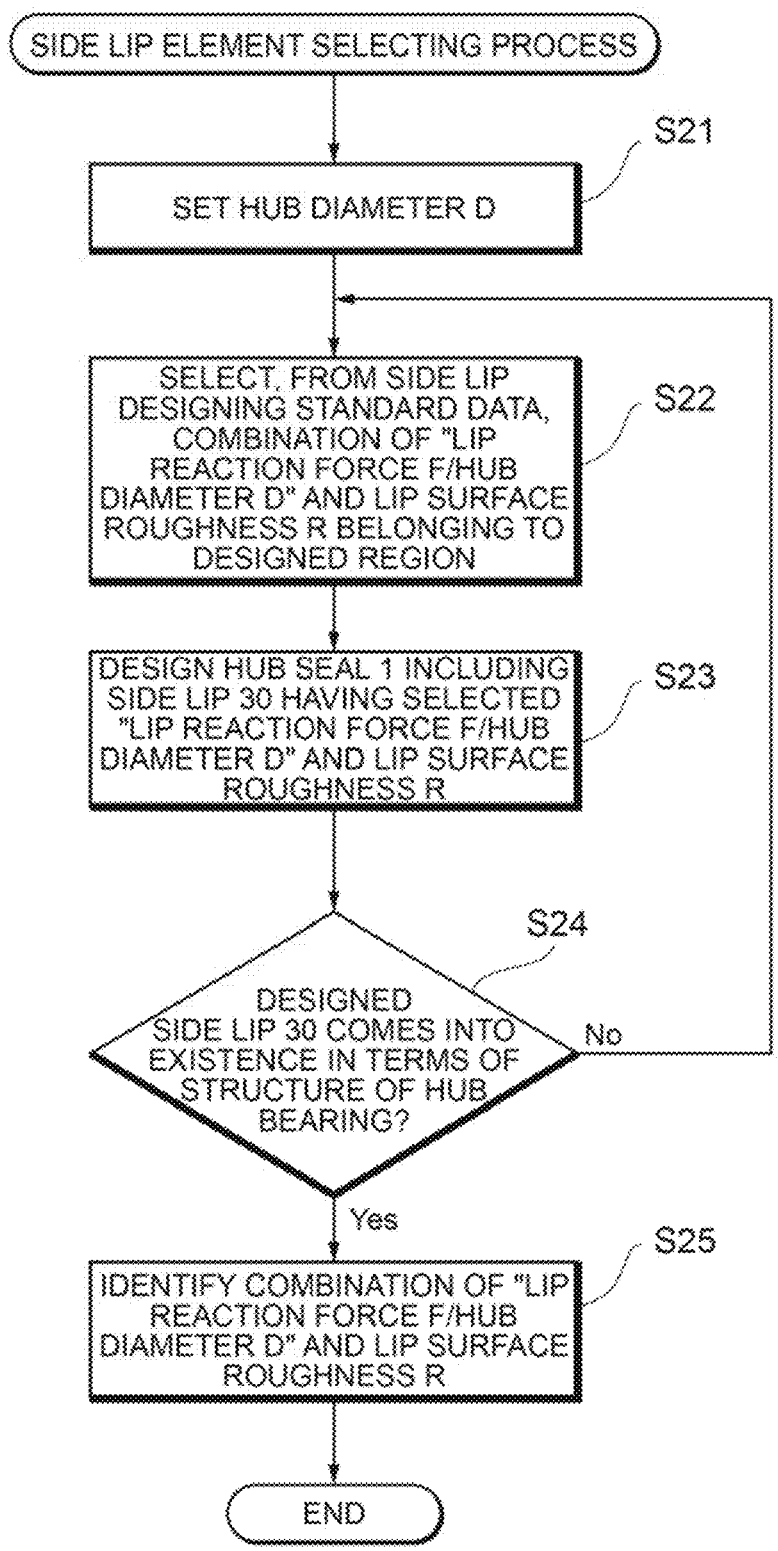
FIG. 12 is a diagram illustrating a flowchart of a side lip element selecting process to select a combination of "lip reaction force F/hub diameter D" and a lip surface roughness R during the hub seal manufacturing process illustrated in FIG. 10.

Moreover, FIG. 12 illustrates a flowchart illustrating a side lip element selecting process to select a combination of the "lip reaction force F/hub diameter D" and the lip surface roughness R in Step S2 of the method of manufacturing a hub seal illustrated in FIG. 10. In the side lip element selecting process, the hub diameter D is first set on the basis of the specifications of a hub bearing in which the hub seal 1 is to be used (Step S21). Subsequently, the combination of the "lip reaction force F/hub diameter D" and the lip surface roughness R belonging to the designed region is selected from the side lip designing standard data referred to in Step S1 of the method of manufacturing a hub seal illustrated in FIG. 10 (Step S22). Subsequently, the side lip 30 having the "lip reaction force F/hub diameter D" and the lip surface roughness R selected in Step S22 is designed (Step S23). Subsequently, it is determined whether or not the side lip 30 designed in Step S23 comes into existence in terms of the structure of the hub bearing in which the hub seal 1 is to be used (Step S24). In response to the side lip 30 being determined to come into existence in Step S24 (Yest in Step S24), the combination of the "lip reaction force F/hub diameter D" and the lip surface roughness R selected in Step S22 is identified as a combination of the "lip reaction force F/hub diameter D" and the lip surface roughness R to select in Step S25. In contrast, in response to the side lip 30 being determined not to come into existence in Step S24 (No in Step S24), the process returns to Step S22 and a different combination of the "lip reaction force F/hub diameter D" and the lip surface roughness R belonging to the designed region is selected.

Figure 13:
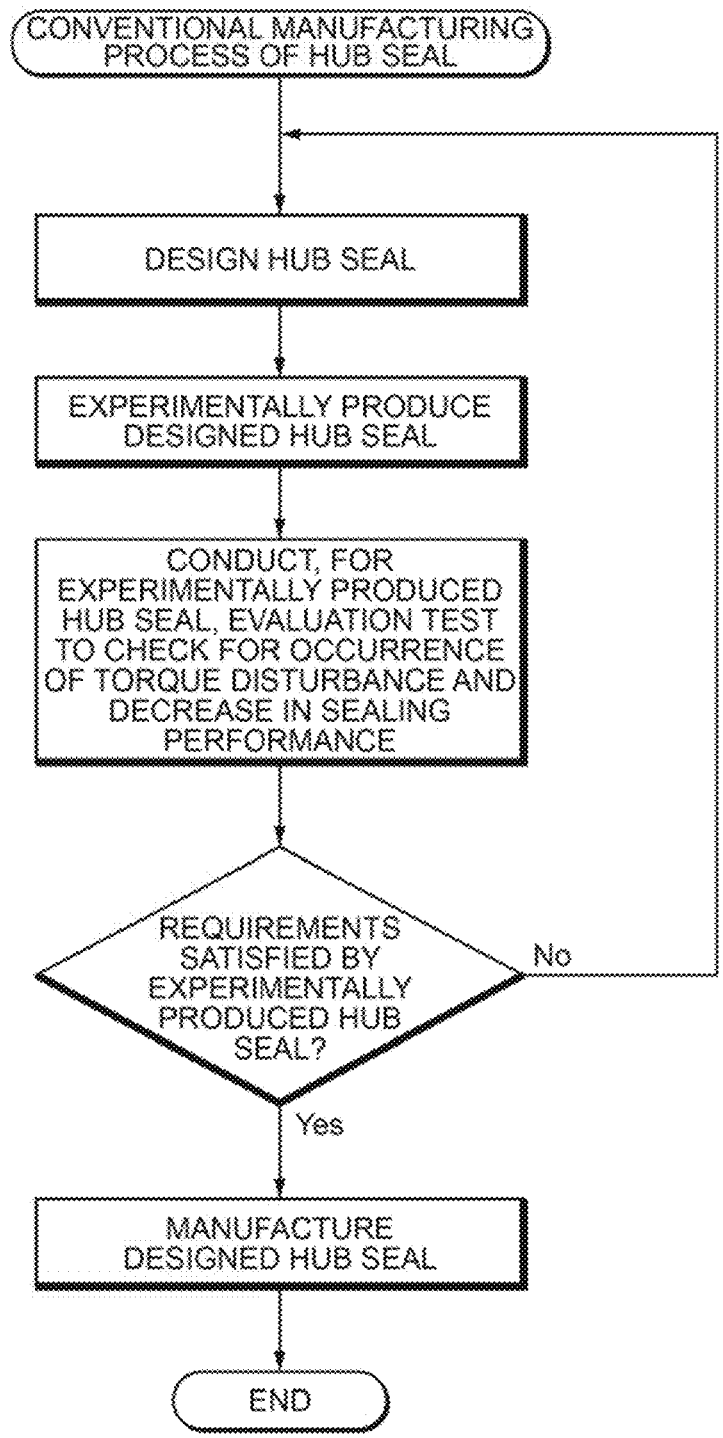
FIG. 13 is a diagram illustrating a flowchart of a conventional method of manufacturing a hub seal.

FIG. 13 is a diagram illustrating a flowchart of a conventional method of manufacturing a hub seal. According to the conventional method of manufacturing a hub seal, a hub seal is designed on the basis of the specifications of a hub bearing that is a target for the use of the hub seal, the designed hub seal is experimentally produced, and an evaluation test to check for the occurrence of the torque disturbance of a hub and a decrease in sealing performance is performed for the experimentally produced hub seal. Then, in response to the designed hub seal being determined to fail to satisfy requirements through the evaluation test, a hub seal is newly designed, the newly designed hub seal is manufactured, and the evaluation test is performed therefor. It takes a long period of time to newly design and manufacture a hub seal and perform the evaluation test for the newly manufactured hub seal. In contrast, according to the method of manufacturing a hub seal according to the embodiment of the present disclosure, once the side lip designing standard data is generated, it is possible to design the side lip 30 without the necessity of performing the evaluation test and manufacture the hub seal 1 in a shorter period of time.

Therefore, the method of manufacturing a hub seal according to the embodiment of the present disclosure makes it possible to reduce a decrease in sealing performance and reduce a disturbance in the rotation torque of the hub bearing 50 and the production of an abnormal noise even though there are machining scratches left on the inner surface 55d and the transition portion 55c of the wheel mounting flange 55b of the hub ring 55 with which the side lip 30 is in contact with the in-use state.

Hereinabove, the embodiment of the present disclosure is described but the present disclosure is not limited to the above-described method of manufacturing a hub seal according to the embodiment of the present disclosure and includes any aspect within the concept of the present disclosure and the scope of the claims. Moreover, the configurations may be selectively combined as appropriate so as to achieve at least a part of the above-described problem and effects.

The invention claimed is:

1. A method of manufacturing a hub seal, the hub seal including a side lip and being designed to seal a space between an outer ring and a hub of a hub bearing, the method comprising:
selecting, from within a designed region set in advance on a basis of a value (lip reaction force F/hub diameter D) given by dividing a reaction force F, which is a value of a reaction force of the side lip in an in-use state, by a hub diameter D, which is a value of a diameter of the hub, and a lip surface roughness R, which is a value of a surface roughness of a seal surface that is a surface of the side lip to be in contact with the hub, the lip reaction force F/hub diameter D and the lip surface roughness R, the designed region being a region of the lip reaction force F/hub diameter D and the lip surface roughness R;
designing the hub seal such that the lip reaction force F/hub diameter D and the lip surface roughness R become the selected lip reaction force F/hub diameter D and lip surface roughness R; and
manufacturing the hub seal such that the hub seal becomes the designed hub seal, wherein
the designed region is a region included in neither torque disturbance region nor a sealing performance decrease region, the torque disturbance region being a region of the lip reaction force F/hub diameter D and the lip surface roughness R and that is set in advance on the basis of the lip reaction force F/hub diameter D and the lip surface roughness R, the sealing performance decrease region being a region of the lip reaction force F/hub diameter D and the lip surface roughness R and that is set in advance on the basis of the lip reaction force F/hub diameter D and the lip surface roughness R,
the torque disturbance region is a region where torque disturbance is supposed to occur, and
the sealing performance decrease region is a region where a sealing performance is supposed to decrease.

2. The method of manufacturing a hub seal according to claim 1, wherein
the lip reaction force F is determined on a basis of at least one of an angle of an extending direction of the side lip relative to a direction orthogonal to an axis of the hub seal, a length of the side lip in the extending direction, a thickness of the side lip in a direction orthogonal to the extending direction, and a shape of a root of the side lip.

3. The method of manufacturing a hub seal according to claim 1, wherein
the lip reaction force F/hub diameter D and the lip surface roughness R are selected from within a target region, the target region being a region set in advance in the designed region.

4. The method of manufacturing a hub seal according to claim 3, wherein
a range of the lip reaction force F/hub diameter D in the target region is in a range from 0.05 N/mm to 0.09 N/mm,
a range of the lip surface roughness R in the target region is in a range from RzJIS 10 μm−α to RzJIS 10 μm+α, and
the α is a tolerance during forming of the side lip.

5. The method of manufacturing a hub seal according to claim 1, wherein
whether or not the side lip having the selected lip reaction force F/hub diameter D and lip surface roughness R comes into existence in the hub bearing is determined to select the lip reaction force F/hub diameter D and the lip surface roughness R.

\* \* \* \* \*